US011320929B2

(12) United States Patent
Mani

(10) Patent No.: US 11,320,929 B2
(45) Date of Patent: May 3, 2022

(54) ASSISTIVE DEVICE WITH A REFRESHABLE HAPTIC FEEDBACK INTERFACE

(71) Applicant: Alex Hamid Mani, LaJolla, CA (US)

(72) Inventor: Alex Hamid Mani, LaJolla, CA (US)

( * ) Notice: Subject to any disclaimer, the term of this patent is extended or adjusted under 35 U.S.C. 154(b) by 0 days.

(21) Appl. No.: 17/124,563

(22) Filed: Dec. 17, 2020

(65) Prior Publication Data

US 2021/0103334 A1    Apr. 8, 2021

Related U.S. Application Data

(63) Continuation of application No. 16/854,987, filed on Apr. 22, 2020, now Pat. No. 10,884,544, which is a continuation of application No. 16/297,960, filed on Mar. 11, 2019, now Pat. No. 10,747,359, which is a continuation of application No. 15/709,882, filed on Sep. 20, 2017, now Pat. No. 10,275,083.

(51) Int. Cl.
*G06F 3/041*    (2006.01)
*G06F 3/01*    (2006.01)

(52) U.S. Cl.
CPC ............ *G06F 3/0416* (2013.01); *G06F 3/016* (2013.01)

(58) Field of Classification Search
None
See application file for complete search history.

(56) References Cited

U.S. PATENT DOCUMENTS

| | | | |
|---|---|---|---|
| 6,650,338 | B1 | 11/2003 | Kolarov et al. |
| 7,855,657 | B2 | 12/2010 | Doemens et al. |
| 8,410,916 | B1 | 4/2013 | Gladson et al. |
| 8,754,757 | B1 | 6/2014 | Ullrich et al. |
| 9,147,328 | B2 | 9/2015 | Ioffreda et al. |
| 9,635,440 | B2 | 4/2017 | Lacroix |
| 9,919,208 | B2 | 3/2018 | Rihn et al. |
| 9,928,701 | B2 | 3/2018 | Levesque et al. |
| 9,946,346 | B2 | 4/2018 | Kawamura et al. |
| 10,831,311 | B2 | 11/2020 | Mani et al. |
| 2006/0038781 | A1 | 2/2006 | Levin |
| 2012/0169620 | A1 | 7/2012 | Bowler |

(Continued)

OTHER PUBLICATIONS

Non-Final Office Action for U.S. Appl. No. 17/037,408 dated Jun. 9, 2021.

(Continued)

*Primary Examiner* — Nicholas J Lee
(74) *Attorney, Agent, or Firm* — Chip Law Group

(57) ABSTRACT

An assistive device and method to provide non-visual assistance to a user to perceive the surrounding world, comprises a haptic feedback interface that includes a plurality of haptic elements. The assistive device generates a first touch-discernible output layout on the haptic feedback interface using the plurality of haptic elements. The first touch-discernible output layout corresponds to a first reproduction of a 3D real-world area within a first proximity range of the assistive device. The first touch-discernible output layout includes at least a first set of haptic indicators to discern movement of a first set of moving objects within the first proximity range. The first touch-discernible output layout is updated to a second touch-discernible output layout based on a change of the first proximity range to a second proximity range. A rate-of-change of movement of one or more of haptic indicators is controlled on the haptic feedback interface.

20 Claims, 11 Drawing Sheets

(56) References Cited

U.S. PATENT DOCUMENTS

| | | |
|---|---|---|
| 2012/0194420 A1 | 8/2012 | Osterhout et al. |
| 2013/0038792 A1 | 2/2013 | Quigley et al. |
| 2014/0267904 A1 | 9/2014 | Saboune et al. |
| 2015/0302772 A1 | 10/2015 | Yu et al. |
| 2016/0378214 A1 | 12/2016 | Chi et al. |
| 2017/0024010 A1 | 1/2017 | Weinraub |
| 2017/0177085 A1 | 6/2017 | Sun et al. |
| 2017/0236330 A1 | 8/2017 | Seif |
| 2019/0290493 A1 | 9/2019 | Lin et al. |

OTHER PUBLICATIONS

Notice of Allowance for U.S. Appl. No. 16/927,091 dated May 17, 2021.
Corrected Notice of Allowance for U.S. Appl. No. 16/927,091 dated Sep. 21, 2021.
Final Office Action for U.S. Appl. No. 17/037,408 dated Oct. 4, 2021.
Non-Final Office Action for U.S. Appl. No. 17/037,408 dated Feb. 17, 2022.

ASSISTIVE DEVICE WITH A REFRESHABLE HAPTIC FEEDBACK INTERFACE

CROSS-REFERENCE TO RELATED APPLICATIONS/INCORPORATION BY REFERENCE

This patent application makes reference to, claims priority to, claims the benefit of, and is a Continuation Application of U.S. Pat. No. 10,884,544, issued on Jan. 5, 2021, which is a Continuation Application of U.S. Pat. No. 10,747,359, issued on Aug. 18, 2020, which is a Continuation Application of U.S. Pat. No. 10,275,083, issued on Apr. 30, 2019.

Each of the above referenced patent applications is hereby incorporated herein by reference in its entirety.

FIELD

Various embodiments of the disclosure relate to assistive technologies. More specifically, various embodiments of the disclosure relate to an assistive device with a refreshable haptic feedback interface and a method to provide non-visual assistance to a user by the assistive device.

BACKGROUND

With the growth of human-machine interaction (HMI) and sensor technologies, various types of assistive devices have been developed. However, technological developments in HMI are mostly focused on vision-based interaction technology. Humans have five traditional recognized senses, sight (ophthalmoception), hearing (audioception), taste (gustaoception), smell (olfacoception or olfacception), and touch (tactioception). The loss of one or more senses generally results in enhancement of one or more of the remaining senses to compensate for the lost sense(s). For people that have loss or impaired sight, existing technology are typically focused on Braille-based or other rudimentary forms of tactile presentation systems. As existing technology are typically focused on Braille based tactile presentations or other conventional tactile forms, HMI for people that have loss or impaired sight are usually limited to use of separate input and output interfaces, for example, a separate 6-keys or 8-keys Braille input and a separate rudimentary form of tactile output that are of limited functionality and use. For people that have impaired sight, it may be a challenging task to understand the surrounding world similar to the sighted people using the existing systems. Thus, an advanced assistive device may be required for providing non-visual assistance to a user for enhanced understanding of the surrounding world.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An assistive device with a refreshable haptic feedback interface and a method for providing non-visual assistance to a user by the assistive device substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
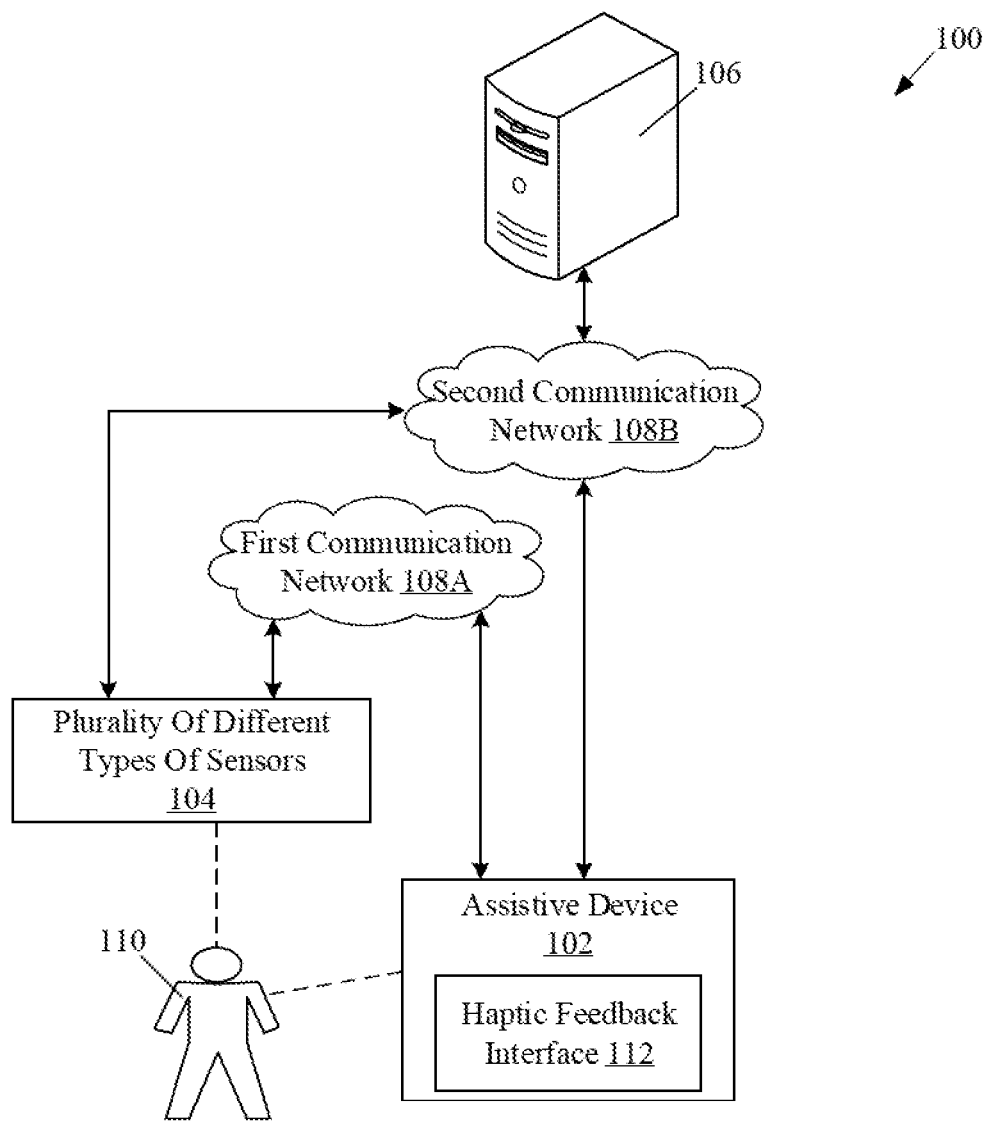
FIG. 1 illustrates an exemplary environment for providing non-visual assistance to a user by an assistive device, in accordance with an embodiment of the disclosure.

The following described implementations may be found in the disclosed assistive device and method for providing non-visual assistance to a user to perceive the surrounding world. Exemplary aspects of the disclosure may include an assistive device that may include a haptic feedback interface that comprises a plurality of haptic elements. The assistive device may further include a haptic feedback controller configured to generate a first touch-discernible output layout on the haptic feedback interface using the plurality of haptic elements. The first touch-discernible output layout may correspond to a first reproduction of a three-dimensional (3D) real-world area within a first proximity range of the assistive device. The first touch-discernible output layout may include at least a first set of haptic indicators to discern movement of a first set of moving objects within the first proximity range. The haptic feedback controller may be configured to update the first touch-discernible output layout to a second touch-discernible output layout based on a change of the first proximity range to a second proximity range. The haptic feedback controller may be configured to control a rate-of-change of movement of one or more of haptic indicators of the first set of haptic indicators or a second set of haptic indicators within the second proximity range on the haptic feedback interface, based on the update and a difference between the first proximity range and the second proximity range.

In accordance with an embodiment, the first touch-discernible output layout may be a first 3D layout that comprises a first plurality of different haptic indicators. The first plurality of different haptic indicators may be spatially arranged on the haptic feedback interface in a defined region such that a spatial arrangement of a plurality of objects in the 3D real-world area within the first proximity range of the assistive device is discernible by tactioception based on a user touch on the first touch-discernible output layout. The second touch-discernible output layout may be a second 3D layout that comprises a second plurality of different haptic indicators. The second plurality of different haptic indicators may be spatially arranged on the haptic feedback interface in the defined region such that a spatial arrangement of a plurality of objects in the 3D real-world area within the second proximity range of the assistive device is discernible by tactioception based on a user touch on the second touch-discernible output layout.

In accordance with an embodiment, the haptic feedback controller may be further configured to generate a plurality of different haptic indicators on the haptic feedback interface by the plurality of haptic elements to discern a plurality of objects of the 3D real-world area within the first proximity range or the second proximity range from the assistive device. The plurality of different haptic indicators are generated by a touch-discernible modality that includes at least one of a differential pressure-based modality, a differential temperature-based modality, a differential electric pulse-based modality, a differential raised shape pattern-based modality, or a combination of different touch-discernible modalities.

In accordance with an embodiment, the assistive device may also include a first circuitry that may be configured to receive sensor data of the 3D real-world area within the first proximity range or the second proximity range of the assistive device in real time or near-real time from a plurality of sensors that are communicatively coupled to the assistive device. The assistive device may further include a second circuitry that may be configured to identify an object-type of each of a plurality of objects present within the first proximity range or the second proximity range of the assistive device based on the received sensor data.

In accordance with an embodiment, the haptic feedback controller may be further configured to generate a plurality of different haptic indicators via the haptic feedback interface to discern different identified object-types of the plurality of objects present within the first proximity range or the second proximity range of the assistive device by tactioception based on a user touch on a defined region of the haptic feedback interface. The second circuitry may be further configured to determine a scaling factor based on the difference between the first proximity range and the second proximity range. The rate-of-change of movement of the one or more of haptic indicators of the first set of haptic indicators may be controlled in accordance with the determined scaling factor.

In accordance with an embodiment, each of the first set of haptic indicators in the first touch-discernible output layout may be generated as a protrusion of a defined shape-pattern from the haptic feedback interface. In some embodiments, a series of protrusions may be generated along a path on the haptic feedback interface to discern movement of an object of the first set of moving objects within the first proximity range by tactioception based on a user touch on the first touch-discernible output layout on the haptic feedback interface.

In accordance with an embodiment, the second circuitry may be configured to acquire a first template map of the 3D real-world area within the first proximity range of the assistive device from a server. The first template map may be acquired based on a current position of the assistive device in the 3D real-world area. The first template map may be updated with at least positional information of the first set of moving objects based on sensor data of the 3D real-world area within the first proximity range of the assistive device, received from a plurality of sensors in real time or near-real time.

In accordance with an embodiment, the haptic feedback controller may be configured to control output of an audio feedback by one or more audio output devices provided in the assistive device in combination with the first touch-discernible output layout or the second touch-discernible output layout. The output of the audio feedback in combination with the first touch-discernible output layout or the second touch-discernible output layout may be controlled for a non-visual multi-sense discern of 3D real-world area within the first proximity range or the second proximity range of the assistive device by a user of the assistive device. The non-visual multi-sense discern refers to discerning of the surrounding 3D real-world area by a user using two or more human senses other than sight (ophthalmoception). For example, based on a combination of the hearing and touch sense, the 3D real-world area within the first proximity range or the second proximity range of the assistive device may be perceived by a user of the assistive device. The output of the audio feedback may be provided as the user navigates or transitions from a first location to a second location within the first proximity range or the second proximity range.

In accordance with an embodiment, the haptic feedback controller may be further configured to execute a haptic zoom-in operation of a portion of the first touch-discernible output layout to increase a haptic resolution of the first touch-discernible output layout on the haptic feedback interface based on a user input via the haptic feedback interface. The first touch-discernible output layout may be updated to the second touch-discernible output layout based on the haptic zoom-in operation.

In accordance with an embodiment, the first proximity range may be greater than the second proximity range. In some embodiments, the first proximity range may be smaller than the second proximity range. The first touch-discernible output layout may include a unique haptic indicator that corresponds to a position of a user of the assistive device. The unique haptic indicator of the first plurality of different haptic indicators generated on the haptic feedback interface may be indicative of a relative position of the user with respect to each of the plurality of objects present in the 3D real-world area within the first proximity range of the assistive device.

In accordance with an embodiment, the second touch-discernible output layout may also include the unique haptic indicator that corresponds to a current position of the user of the assistive device on the second touch-discernible output layout. The unique haptic indicator of the second plurality of different haptic indicators generated on the haptic feedback interface may be indicative of a relative position of the user with respect to each of the plurality of objects present in the 3D real-world area within the second proximity range of the assistive device.

FIG. 1 illustrates an exemplary environment for providing non-visual assistance to a user by an assistive device, in accordance with an embodiment of the disclosure. With reference to FIG. 1, there is shown an exemplary environment 100. The exemplary environment 100 may include an assistive device 102, a plurality of different types of sensors 104, a server 106, a first communication network 108A, a second communication network 108B, and one or more users, such as a user 110. The assistive device 102 may include a haptic feedback interface 112. The assistive device 102 may be communicatively coupled to the plurality of different types of sensors 104 via the first communication network 108A or the second communication network 108B. The assistive device 102 may be communicatively coupled to the server 106 via the second communication network 108B.

The assistive device 102 may include suitable logic, circuitry, and/or code to generate a first touch-discernible output layout on the haptic feedback interface 112. The first touch-discernible output layout may correspond to a first reproduction of a three-dimensional (3D) real-world area within a first proximity range of the assistive device 102. The first touch-discernible output layout may be updated to a second touch-discernible output layout based on a change of the first proximity range to a second proximity range. The 3D real-world area surrounding the user 110 may be an indoor area or an outdoor area. Examples of implementation of the assistive device 102 may include, but are not limited to a special-purpose portable assistive device, special-purpose hand gloves, special-purpose shoes, or a wearable device that may be worn as a wrist band, wrapped around arms, or any part of human body or as a shoe sole.

The plurality of different types of sensors 104 may comprise suitable logic, circuitry, and/or interfaces that may be configured to detect one or more cues of the 3D real-world area surrounding the user 110, and generate a corresponding output, such as sensor data. The plurality of different types of sensors 104 may include wearable sensors that may be worn by the user 110, sensors that may be integrated with the assistive device 102, or other personal devices, such as a smartphone, of the user 110. The plurality of different types of sensors 104 refers to a plurality of different types of sensors. Examples of the plurality of different types of sensors 104 may include, but are not limited to, a motion sensor (such as an accelerometer and a gyroscope), a location sensor (such as a global positioning system (GPS) sensor), a direction detecting sensor (such as a compass or magnetometer), an image-capture device (such as a stereoscopic camera, 360 degree camera, a wide-angle camera, or other image sensors), an atmospheric pressure detection sensor (such as a barometer), a depth sensor, an altitude detection sensor (such as altimeter), a lux meter, a radio frequency (RF) sensor, an ultrasound sensor, or an object detection sensor (such as Radar, Light Detection and Ranging (LIDAR), and an infrared (IR) sensor).

The server 106 may comprise suitable logic, circuitry, interfaces, and/or code that may be configured to store satellite imagery, street maps, and 360 degree panoramic views of streets of various geographical areas. In some embodiments, the server 106 may be configured to communicate a first template map of the 3D real-world area for a location of the assistive device 102, based on a template map request for the location received from the assistive device 102. In accordance with an embodiment, the server 106 may be configured to store historical usage pattern data of a plurality of different users, such as the user 110. Examples of the server 106 may include, but are not limited to, a cloud server, an application server, a database server, a web server, a file server, and/or any combination thereof.

The first communication network 108A may be a medium that may enable communication between the assistive device 102 and the plurality of different types of sensors 104. The first communication network 108A may be implemented by one or more wired or wireless communication technologies known in the art. The first communication network 108A may refer to a short-range or medium-range wireless communication network. Examples of wireless communication networks may include, but are not be limited to, a Wireless-Fidelity (Wi-Fi) based network, a Light-Fidelity (Li-Fi) based network, a wireless personal area network (WPAN) such as a BLUETOOTH™ network, Internet-of-Things (IoT) network, Machine-Type-Communication (MTC) network, and/or a Wi-Max based network.

The second communication network 108B may be a medium that may facilitate communication between the assistive device 102 and the server 106. The second communication network 108B may be implemented by one or more wireless communication technologies known in the art. Examples of the wireless communication networks may include, but not limited to, the Internet, a cloud network, a wireless wide area network (WWAN), a Local Area Network (LAN), a plain old telephone service (POTS), a Metropolitan Area Network (MAN), or a cellular or mobile network, such as Global System for Mobile Communications (GSM), General Packet Radio Service (GPRS), Enhanced Data Rates for GSM Evolution (EDGE), 1G, 2G, 3G, 4G Long Term Evolution (LTE), 5G, IEEE 802.11, 802.16, and the like.

The haptic feedback interface 112 may comprise a plurality of haptic elements. In accordance with an embodiment, the haptic feedback interface 112 may refer to a haptic output interface configured to provide at least a touch-discernible output to the user 110. In some embodiments, the haptic feedback interface 112 may refer to a haptic input/output (I/O) interface configured to receive haptic input as well as provide haptic output to the user 110 from the same haptic I/O interface. It is known that the sense of touch has a much greater sensory resolution than the sense of sight. Hence, the sense of touch can detect even small changes on a surface that the eye cannot detect. This principle of the sense of touch may be used to guide the design of the haptic feedback interface 112.

In accordance with an embodiment, the user 110 may be a person who have lost or impaired the sense of sight. The user 110 may want to learn and understand about the surrounding world. It is known that sighted people visualize the surrounding world by detection of edges between areas of different wavelengths of light, which is then perceived as different colors by the brain. Based on feedback from the visual system, visual part of the brain referred to as visual cortex, processes visual information of the surrounding world to enable the sighted people to visualize the surrounding world. It is also known the loss of one or more senses, such as the sense of sight, generally results in enhancement of one or more of the remaining senses, such as sense of touch, hearing, smell, or taste, to compensate for the lost sense(s). The assistive device 102 harnesses the non-visual senses, such as the sense of touch, hearing, or smell, to assist users, such as the user 110, who have lost or impaired the sense of sight for enhanced and accurate understanding of the 3D real-world area surrounding the user 110. The assistive device 102 may also be used even by sighted people in certain situations where human vision is of limited use, for example, in areas that are devoid or partially devoid of light, for example, during night to augment sense of sight using other human senses, such as audioception, olfacoception, and tactioception.

In operation, the assistive device 102 may be configured to receive sensor data of the 3D real-world area within the first proximity range of the assistive device 102 from the plurality of different types of sensors 104 that are communicatively coupled to the assistive device 102. The plurality of different types of sensors 104, for example, may include the location sensor, the motion sensor, the RF sensor, the ultrasound sensor, the IR sensor, or other types of object detection sensor (such as Radar or LIDAR), and an image-capture device. The image-capture device may refer to a stereoscopic camera, 360 degree camera, a night vision camera, a wide-angle camera, or other image sensors or their combination. Thus, in certain scenarios, where one type of sensor may not capture accurate information of the 3D real-world area within the first proximity range of the assistive device 102, other types of sensors may compliment and capture of information of the 3D real-world area.

In accordance with an embodiment, the plurality of different types of sensors 104 may include sensors, for example, rain sensors, altimeter, lux meter, barometer, and the like, that senses environmental conditions and/or characteristics, such as weather conditions or lighting conditions). Based on the environmental conditions and/or characteristics, information of the 3D real-world area acquired from a first group of sensors of the plurality of different types of sensors 104 may be assigned a higher weigh value (i.e. preferable) than information acquired from a second group of sensors of the plurality of different types of sensors 104. The classification of sensors in the first group of sensors and the second group of sensors may be done based on defined criteria and the sensed environmental conditions and/or characteristics. The defined criteria, for example, may be defined rules based on known accuracy of information detected in different environment conditions from each sensor. For example, in certain weather condition, the information, such as images captured from the image-capture device may not be useful. In such cases, the sensor data from the RF sensor, LIDAR, ultrasound sensor, or the like, may be provided higher weight value as compared to the sensor data from the image-capture device.

In accordance with an embodiment, the sensor data received from each of the plurality of different types of sensors 104 may be in different formats. The assistive device 102 may be configured to transform the received sensor data into a common format to enable a correlation of information received from one sensor to other sensor of each of the plurality of different types of sensors 104. The sensor data from different input sources (i.e. the plurality of different types of sensors 104 may be processed concurrently into a common format.

In accordance with an embodiment, the assistive device 102 may be configured to generate a first touch-discernible output layout on the haptic feedback interface 112 using the plurality of haptic elements. The first touch-discernible output layout may correspond to a first reproduction of the 3D real-world area within a first proximity range of the assistive device 102. The first touch-discernible output layout includes at least a first set of haptic indicators to discern movement of a first set of moving objects within the first proximity range. The assistive device 102 may be configured to update the first touch-discernible output layout to a second touch-discernible output layout based on a change of the first proximity range to a second proximity range. An example of the update of the first touch-discernible output layout to the second touch-discernible output layout is shown and described, for example, in FIG. 6B.

The assistive device 102 may be configured to control a rate-of-change of movement of one or more of haptic indicators of the first set of haptic indicators or a second set of haptic indicators on the haptic feedback interface 112. The rate-of-change of movement may be controlled based a difference between the first proximity range and the second proximity range. For example, in cases where a sighted user looks very far (e.g. beyond "X" meters) in the 3D real-world area, the changes, such as movement of objects, may appear slow as compared to when the sighted user looks nearby (i.e. up to "Y" meters). In cases where the sighted user looks nearby (e.g. Y=30 meters), the changes, such as movement of objects, appears to be fast. Thus, in haptic domain, the one or more of haptic indicators of the first set of haptic indicators or the second set of haptic indicators that indicate moving objects may be controlled in accordance with the difference between the first proximity range and the second proximity range (i.e. "X-Y") for a realistic discerning of the 3D real-world area in accordance with the change in the proximity range, for example from far-to-near or from near-to-far. An exemplary control of the rate-of-change of movement of the one or more haptic indicators in the second touch-discernible output layout is shown and described, for example, in FIG. 6B.

The somatic sensory system of human body is responsible for the sense of touch and has sensory touch or pressure receptors that enable a human to detect and feel when something comes into contact with skin. The sense of touch may also be referred to as somatic senses or somesthetic senses that include proprioception (e.g. sense of position and movement) or haptic perception. Typically, such sensory receptors for sense of touch are present, for example, on the skin, epithelial tissues, muscles, bones and joints, and even on certain internal organs of the human body. In some embodiments, the assistive device 102 may be implemented as one or more wearable devices that may be worn around at different parts of the human body. Examples of the implementation of the assistive device 102 as wearable assistive device or a combination of the wearable and hand-held assistive device are shown, for example, in FIGS. 3, 4A, 4B, and 5.

Figure 2A:
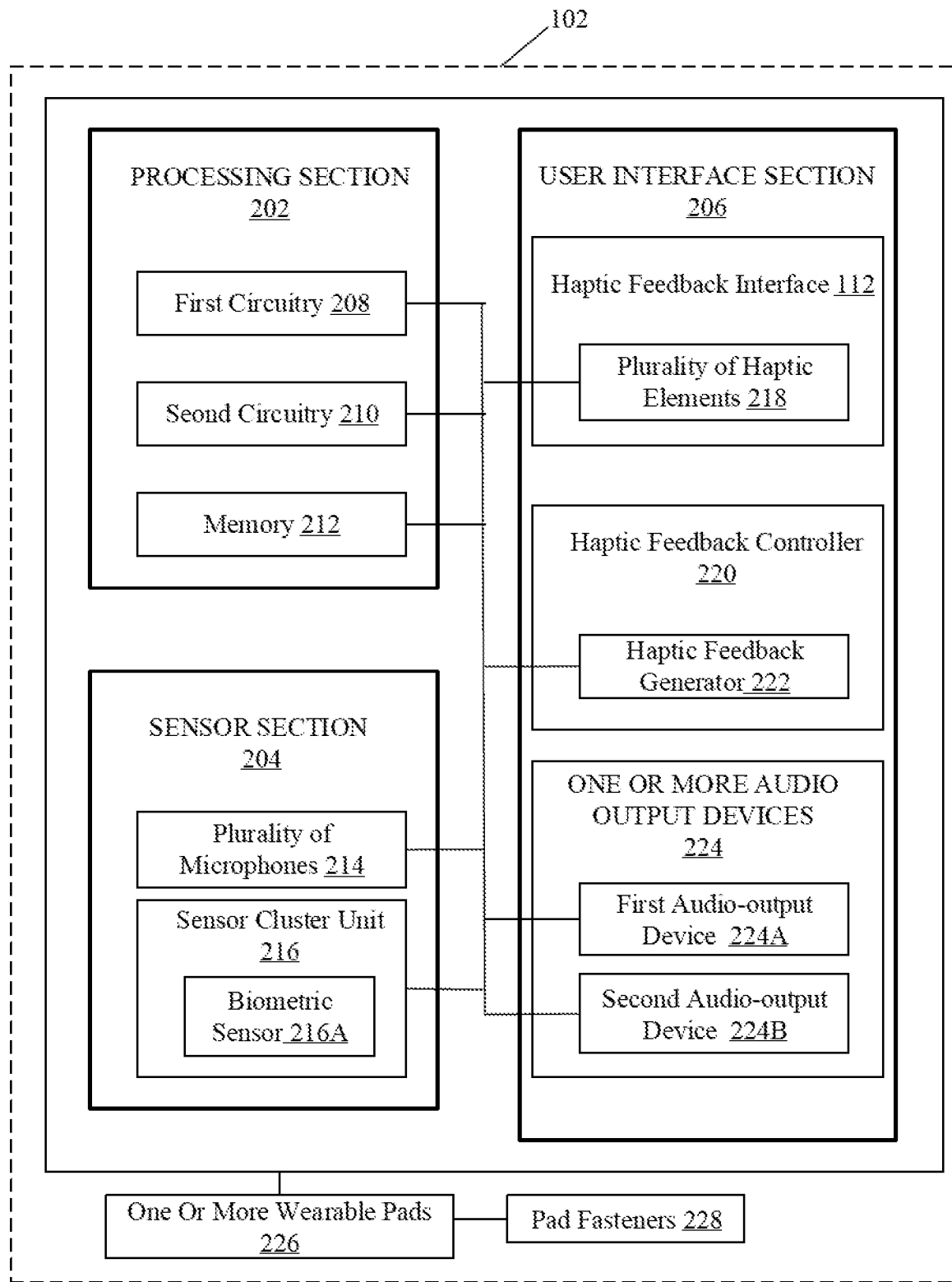
FIG. 2A is a block diagram that illustrates an exemplary assistive device for providing non-visual assistance to a user, in accordance with an embodiment of the disclosure.

FIG. 2A is a block diagram that illustrates an exemplary assistive device for non-visually discerning a 3D real-world area surrounding a user of the assistive device, in accordance with an embodiment of the disclosure. FIG. 2A is explained in conjunction with elements from FIG. 1. With reference to FIG. 2A, there is shown the assistive device 102. The assistive device 102 may include a processing section 202, a sensor section 204, and a user interface section 206. The processing section 202 may include a first circuitry 208, a second circuitry 210, and a memory 212. The sensor section 204 may include a plurality of microphones 214 and a sensor cluster unit 216. The sensor cluster unit 216 may include at least a biometric sensor 216A. The user interface section 206 may include the haptic feedback interface 112, a haptic feedback controller 220, and one or more audio-output devices, such as a first audio-output device 224A and a second audio-output device 224B. The haptic feedback interface 112 may include a plurality of haptic elements 218. The haptic feedback controller 220 may include a haptic feedback generator 222.

In accordance with an embodiment, the assistive device 102 may be communicatively coupled to the plurality of different types of sensors 104 through the first communication network 108A and/or the second communication network 108B, by use of the first circuitry 208. The second circuitry 210 may be communicatively coupled to the memory 212, and the various components of the sensor section 204 and the user interface section 206, via a system bus.

The first circuitry 208 may comprise suitable logic, circuitry, interfaces, and/or code that may be configured to receive sensor data of the 3D real-world area within a defined proximity range (such as the first proximity range or the second proximity range) of the assistive device 102. The sensor data of the 3D real-world area may be received from the plurality of different types of sensors 104, via the first communication network 108A. In some embodiments, the one or more sensors of the plurality of different types of sensors 104 may be provided as a part of the sensor cluster unit 216 as integrated sensors. In such a case, the sensor data may be acquired by the system bus for processing by the second circuitry 210. The first circuitry 208 may be further configured to communicate with external devices, such as the server 106, via the second communication network 108B. The first circuitry 208 may implement known technologies to support wireless communication. The first circuitry 208 may include, but are not limited to, a transceiver (e.g. a radio frequency (RF) transceiver), an antenna, one or more amplifiers, a tuner, one or more oscillators, a digital signal processor, a coder-decoder (CODEC) chipset, a subscriber identity module (SIM) card, and/or a local buffer.

The first circuitry 208 may communicate via wireless communication with networks, such as the Internet, an Intranet and/or a wireless network, such as a cellular telephone network, a wireless local area network (WLAN), a personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), BLUETOOTH™, Wireless Fidelity (Wi-Fi) (such as IEEE 802.11a, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Li-Fi, Machine-Type-Communication (MTC) technology, a protocol for email, instant messaging, and/or Short Message Service (SMS).

The second circuitry 210 may refer a digital signal processor (DSP). The second circuitry 210 may comprise suitable logic, circuitry, interfaces, and/or code that may be configured to generate a 3D digital model of the 3D real-world area within the first proximity range based on the processing of the transformed sensor data in the common format. The generated 3D digital model may then be used to generate the first touch-discernible output layout on the haptic feedback interface 112 using the plurality of haptic elements 218. The assistive device 102 may be a programmable device, where the second circuitry 210 may execute instructions stored in the memory 212. Other implementation examples of the second circuitry 210 may include, but are not limited to a specialized DSP, a Reduced Instruction Set Computing (RISC) processor, an Application-Specific Integrated Circuit (ASIC) processor, a Complex Instruction Set Computing (CISC) processor, and/or other processors.

The memory 212 may comprise a learning engine. The second circuitry 210 may be configured to determine one or more patterns in a plurality of user interactions on the haptic feedback interface 112 over a period of time based on a track of a usage pattern of the assistive device 102 by the learning engine. The memory 212 may include suitable logic, circuitry, and/or interfaces that may be configured to store a set of instructions executable by the second circuitry 210. The memory 212 may be further configured to temporarily store one or more captured media streams, such as one or more videos or images of the 3D real-world area within the first proximity range or the second proximity range as image buffer for processing by the second circuitry 210. The memory 212 may also store usage history, an amount of pressure exerted by the user 110 while touching the haptic feedback interface 112 in the plurality of user interactions on the haptic feedback interface 112 over a period of time. The memory 212 may also store input and output preference settings by the user 110. Examples of implementation of the memory 212 may include, but not limited to, a random access memory (RAM), a dynamic random access memory (DRAM), a static random access memory (SRAM), a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The plurality of microphones 214 may comprise suitable circuitry and/or interfaces to receive an audio input. In accordance with an embodiment, the audio input may be provided by the user 110. The audio input may correspond to a voice input to the assistive device 102. In accordance with an embodiment, the plurality of microphones 214 may be muted or disabled in accordance with user preferences. The plurality of microphones 214 may include multiple microphones to capture sound emanating from the first proximity range of the user 110 of the assistive device 102. Each microphone of the plurality of microphones 214 may be fitted at different locations of the assistive device 102 as shown and described, for example, in FIG. 5.

The sensor cluster unit 216 may include a biometric sensor 216A, such as a fingerprint sensor, to decipher the identity of a user, such as the user 110. In certain scenarios, the assistive device 102 may be used by multiple users, for example, users of a same family, or group. In such a case, based on user authentication by use of the biometric sensor, a different usage profile and user settings may be loaded for different users. In some embodiments, the sensor cluster unit 216 may also include a temperature sensor and a pressure sensor to gauge pressure applied by a user, such as the user 110, on the haptic feedback interface 112. In some embodiments, one or more sensors of the plurality of different types of sensors 104 may be a part of the sensor cluster unit 216. For example, the sensor cluster unit 216 may include the location sensor, the image sensor, the RF sensor, the accelerometer, the gyroscope, the compass, the magnetometer, an integrated image-capture device, the depth sensor, the altimeter, a lux meter, an ultrasound sensor, the IR sensor, or one or more weather sensors.

The haptic feedback interface 112 may comprise the plurality of haptic elements 218. The plurality of haptic elements 218 may refer to an array of cylindrical tubes arranged at the surface of the haptic feedback interface 112. A person of ordinary skill in the art may understand that shape of each tube may be variable, such as conical, hexagonal, or other polygonal shapes, without departing from the scope of the disclosure. In accordance with an embodiment, the plurality of haptic elements 218 may be arranged as a layer (of array of cylindrical tubes) on the haptic feedback generator 222 such that a haptic signal may be generated by the haptic feedback generator 222 through each of the plurality of haptic elements 218. In accordance with an embodiment, one end (e.g. a proximal end) of each tube of the array of cylindrical tubes may be coupled to the haptic feedback generator 222, and the other end (e.g. a distal end) may be interspersed on the haptic feedback interface 112 such that a plurality of differential touch-discernible cues generated by the haptic feedback generator 222 in conjunction with the plurality of haptic elements 218 are discernible on the haptic feedback interface 112 by the sense of touch.

The haptic feedback controller 220 may comprise suitable circuitry and interfaces to control output of a touch-discernible feedback on the haptic feedback interface 112 by the haptic feedback generator 222. The haptic feedback controller 220 may be configured to sense a haptic user input via plurality of haptic elements 218 based on a defined amount of pressure detected at one or more haptic elements of the plurality of haptic elements 218. The haptic feedback controller 220 includes the haptic feedback generator 222.

The haptic feedback generator 222 may facilitate generation of the touch-discernible haptic output layouts on the haptic feedback interface 112 under the control of the haptic feedback controller 220. The haptic feedback generator 222 may include one or more differential pressure generating units, differential electric pulse generating units, shape-pattern extension and retraction units, differential temperature generating units, and a level of protrusion setter to control elevation of raised shape patterns, such as spikes through the plurality of haptic elements 218. The haptic feedback generator 222 may be configured to generate a plurality of different haptic indicators by use of one or more of the differential pressure generating units, differential electric pulse generating units, shape-pattern extension and retraction units, differential temperature generating units, and the level of protrusion setter to control elevation of raised shape pattern.

The one or more audio-output devices 224, such as the first audio-output device 224A and the second audio-output device 224B, may comprise suitable circuitry and/or interfaces to generate an audio output for the user 110. In accordance with an embodiment, the audio output may be generated in-sync with the touch-discernible haptic output layout generated on the haptic feedback interface 112. In accordance with an embodiment, the audio output may be generated in-sync with a haptic input received on the haptic feedback interface 112 for multi-sense discern of the touch-discernible output layouts in different proximity range for enhanced understanding of the surrounding of the user 110. The haptic input may be detected by the haptic feedback controller 220 by use of the pressure sensor of the sensor cluster unit 216. In accordance with an embodiment, the one or more audio-output devices 224 may be muted or disabled based on a time-of-day or for a specific location, such as a public library where silence is solicited. Though FIG. 2A is shown to include two audio-input devices, a person of ordinary skill in the art may understand that the assistive device 102 may include a single audio-input device, or more than two audio-input devices. The other speakers may be placed at corners, for example, at extreme left and right corners of the assistive device 102, to aid in voice-based navigation of the user 110 as the user 110 moves with the assistive device 102 from one location to another location in the 3D real-world area. In some embodiments, one or more audio-input devices may be provided or worn at different parts of the body (for example, as shown in FIGS. 3, 4A, 4B, and 5) of the user 110 for voice-based navigation of the user 110 as the user 110 moves with the assistive device 102 from one location to another location in the 3D real-world area. Such voice-based navigation may be provided in combination to the generated touch-discernible feedback, which may act synergistically to provide enhanced navigation assistance to the user 110 in a real time or near-real time as the user 110 moves in the 3D real-world area.

Figure 5:
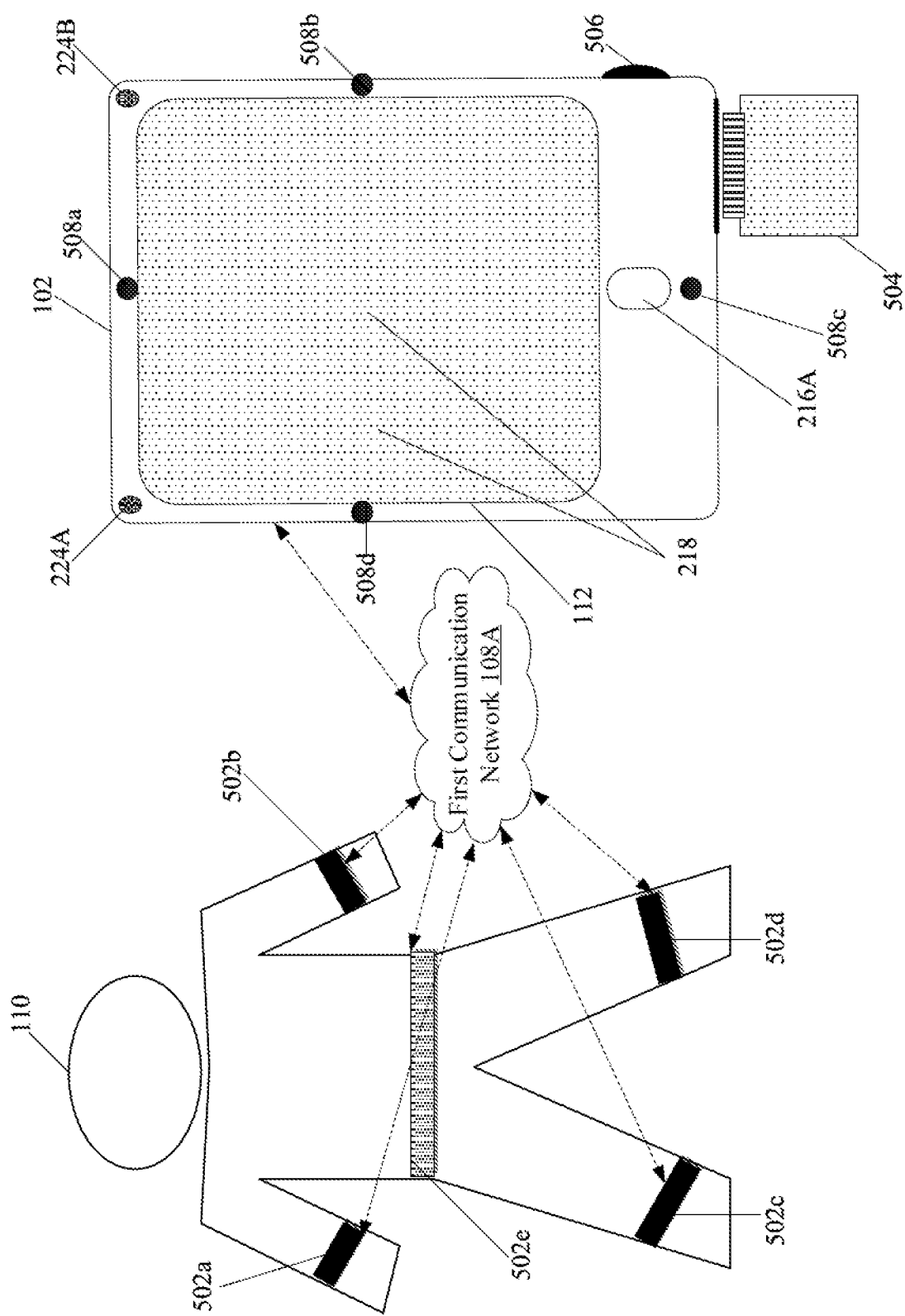
FIG. 5 illustrates a third exemplary implementation of the exemplary assistive device of FIG. 2A as a combination of a plurality of wearable and non-wearable assistive devices for providing non-visual assistance to a user, in accordance with an embodiment of the disclosure.

Each of the one or more wearable pads 226 may refer to a suitable pad that acts as a substrate for the assistive device 102. Each of the one or more wearable pads 226 may be water-resistant pads suitable to be worn on different parts of the human body, such as forearms (FIG. 3), limbs (FIG. 5), waist (FIG. 5). In accordance with an embodiment, each of the one or more wearable pads 226 may be designed such that the haptic feedback interface 112 may be in contact to the skin of the human body. The pad fasteners 228 refer to detachable fasteners that allow the two terminal portions of each of the one or more wearable pads 226 to detachably affix with each other. Examples of the pad fasteners 228 may include, but are not limited to clips, hook and loop fastener, detachable straps, buttons, and the like.

In operation, the second circuitry 210 may be configured to detect a current location of the assistive device 102, by use of the location sensor. As the user 110 may be equipped with the assistive device 102, the location of the assistive device 102 may be same as that of the user 110. The location sensor may be an integrated sensor of the assistive device 102 provided in the sensor cluster unit 216 or may be one of the plurality of different types of sensors 104. The second circuitry 210 may be configured to check whether a first template map of a 3D real-world area for the detected current location of the assistive device 102, is available. In some embodiments, where the first template map of the 3D real-world area is available, the first circuitry 208 may be configured to acquire the first template map of the 3D real-world area within the first proximity range (e.g. the first proximity range 602) of the assistive device 102. The first template map may be acquired from the server 106 based on the current location of the assistive device 102. In some embodiments, the memory 212 may store 2D/3D maps of geographical regions of the earth surface, such as street views. In such a case, the second circuitry 210 may be configured to retrieve the first template map of the 3D real-world area from the memory 212. The first template map may be available for certain outdoor areas, whereas such maps may not be available for indoor areas.

In accordance with an embodiment, the first circuitry 208 may be configured to receive sensor data of the 3D real-world area within the first proximity range of the assistive device 102 from the plurality of different types of sensors 104 that are communicatively coupled to the assistive device 102. In some embodiments, the sensor data may also be received from the sensor cluster unit 216. In some embodiments, the first template map of a 3D real-world area may not be acquired, for example, in case of indoor locations or for regions where the first template map may not be available. In such a case, the sensor data of the 3D real-world area received in real time or near-real time may be used to collect information of the 3D real-world area within the first proximity range of the assistive device 102.

In accordance with an embodiment, the second circuitry 210 may be further configured to identify the object-type of each of the plurality of different objects present within the first proximity range of the assistive device 102 based on the received sensor data. The second circuitry 210 may be configured to determine a relative position of each of the plurality of objects with respect to the position of the user 110 of the assistive device 102. The relative position of each of the plurality of objects may be determined based on the sensor data received in real time or near-real time from the plurality of different types of sensors 104 worn by the user 110. The second circuitry 210 may be configured to determine a height of each of the first plurality of objects from the perspective of the height of the user 110 of the assistive device 102. The second circuitry 210 may be further configured to update the first template map in real time or near-real time based on the sensor data of the 3D real-world area.

The second circuitry 210 may be configured to determine the speed and the direction of travel of each of a first set of moving objects of the first plurality of objects within the first proximity range. In accordance with an embodiment, the second circuitry 210 may be configured to select a first touch-discernible modality from a plurality of touch-discernible modalities to generate a plurality of different haptic indicators on the haptic feedback interface 112. The selection of the first touch-discernible modality may be based on learned user interaction information and a current weather condition in the 3D real-world area for the detected current location of the assistive device 102. The learned user interaction information may be determined based on a historical analysis of usage pattern data of the haptic feedback interface 112 by the learning engine provided in the memory 212. The plurality of touch-discernible modalities includes a differential pressure-based modality, a differential temperature-based modality, a differential electric pulse-based modality, a differential raised shape pattern-based modality. In some embodiments, a combination of different touch-discernible modalities may be selected based on the learned user interaction information, the current weather condition in the 3D real-world area, and a specified user-setting.

The differential pressure-based modality refers to generation of the plurality of different haptic indicators as multi-level pressure or different amount of pressure on the haptic feedback interface. A user, such as the user 110, may feel different amount of pressure at different points (or portions) on the haptic feedback interface 112, which enables the user 110 to discern certain characteristics, for example, positioning or object-type of the plurality of objects, of the 3D real world area by touch on the haptic feedback interface 112. Similarly, the differential temperature-based modality refers to generation of the plurality of different haptic indicators as different temperatures, for example, different combination of hot and cold temperatures, on the haptic feedback interface 112. The different level of temperature may enable the user 110 to discern, certain characteristics, for example, positioning or object-type of the plurality of objects, of the 3D real world area by touch on the haptic feedback interface 112. The differential electric pulse-based modality refers to generation of the plurality of different haptic indicators as different level of electric-pulses on the haptic feedback interface 112. The different level of electric-pulses may enable the user 110 to feel, certain characteristics, for example, positioning or object-type of the plurality of objects, of the 3D real world area by touch on the haptic feedback interface 112. The different level of electric-pulses may be felt as different amount of pain or pricking points. The differential raised shape pattern-based modality refers to generation of the plurality of different haptic indicators as a plurality of protrusions of different shapes that may be extended from the surface of the haptic feedback interface 112. Each protrusion may be a raised shape-pattern or a bulge that may stick out from at least one or a group of haptic elements of the plurality of haptic elements of the haptic feedback interface 112. The plurality of protrusions may represent the plurality of objects of the 3D real-world area within the first proximity range or the second proximity range. An example of the generation of the plurality of different haptic indicators as the plurality of protrusions of different shapes, is shown and described, for example, in FIG. 6B.

In accordance with an embodiment, the haptic feedback controller 220 may be configured to generate the first touch-discernible output layout on the haptic feedback interface 112 using the plurality of haptic elements 218 and the haptic feedback generator 222. The first touch-discernible output layout may be generated using the selected first touch-discernible modality from the plurality of touch-discernible modalities. The first touch-discernible output layout may correspond to a first reproduction of the 3D real-world area within the first proximity range of the assistive device 102. The first touch-discernible output layout may be generated using a modified 3D digital model of the 3D real-world area. The modified 3D digital model of the 3D real-world area by the second circuitry 210 based on the received sensor data. The modified 3D digital model may be generated by removal of one or more irrelevant objects in the 3D real-world area within the first proximity range. The relevancy and irrelevancy of each object in the first plurality of objects may be estimated with respect to the detected current position of the assistive device 102, and the relative positioning of each object of the first plurality of objects from a ground level at which the user 110 is located. For example, a fly-over in the 3D real-world area may not be relevant or useful while the user 110 may move below the fly-over at the ground level. Removal of irrelevant objects detected in the 3D real-world area within the first proximity range for the generation of the modified 3D digital model, may significantly save the processing time and battery power consumption for the generation of the first touch-discernible output layout.

The first touch-discernible output layout may include at least a first set of haptic indicators to discern movement of the first set of moving objects within the first proximity range. The first touch-discernible output layout may be a first 3D layout that comprises a first plurality of different haptic indicators. The first plurality of different haptic indicators may be spatially arranged on the haptic feedback interface 112 in a defined region such that a spatial arrangement of the first plurality of objects in the 3D real-world area within the first proximity range of the assistive device 102 is discernible by tactioception based on a user touch on the first touch-discernible output layout. The first touch-discernible output layout may also include a unique haptic indicator that corresponds to a position of the user 110 of the assistive device 102. The unique haptic indicator may be one of the first plurality of different haptic indicators generated on the haptic feedback interface 112. The unique haptic indicator may be indicative of a relative position of the user 110 with respect to each of the first plurality of objects present in the 3D real-world area within the first proximity range of the assistive device 102. It may be advantageous to include the unique haptic indicator that is representative of the user 110 as it enables the user 110 to non-visually discern the 3D real-world area from the perspective of the user 110 in the first proximity range by a touch on the unique haptic indicator followed by touch on other haptic indicators of the first plurality of different haptic indicators generated on the haptic feedback interface 112.

As the sensor data is received from different input sources (i.e. the plurality of different types of sensors), the computation of the relative position of each of the plurality of objects with respect to the position of the user 110 of the assistive device 102, may be faster and more accurate as compared to sensor data received exclusively from one type of sensor, such as the image-capture device or in different environmental or weather conditions, for example, rain, hailstorm, during night, and the like. Although, an approximate distance of different objects in an image frame may be estimated by image processing, the distance or position of objects calculated from RF sensor or the LIDAR, may be faster and more accurate as compared to the image-processing methods. This helps to quickly and accurately generate the first touch-discernible output layout based on the generated common format of sensor data received from the plurality of different types of sensors 104.

In accordance with an embodiment, the haptic feedback controller 220 may be configured to receive a user input at the assistive device 102 to change the first proximity range to a second proximity range. In some embodiments, the haptic feedback controller 220 may be configured to receive the user input via the haptic feedback interface 112 to initiate at least one of a haptic zoom-in feature or a haptic zoom-out feature. In some embodiments, the haptic feedback controller 220 may be configured to receive the user input by a proximity range setter (e.g. the proximity range setter 506) of the assistive device 102. In accordance with an embodiment, the first proximity range may be greater than the second proximity range. In accordance with an embodiment, the first proximity range may be smaller than the second proximity range.

In accordance with an embodiment, the second circuitry 210 may be configured to calibrate the one or more of the plurality of different types of sensors 104 to receive sensor data in accordance with the second proximity range. The second circuitry 210 may be configured to determine the speed and the direction of travel of each of a second set of moving objects of a second plurality of objects within the second proximity range. The second circuitry 210 may be configured to monitor/track the relative position of each of the second plurality of objects with respect to the position of the user 110 of the assistive device 102. The relative position of each of the second plurality of objects may be monitored based on the sensor data of the second proximity range received in real time or near-real time from the plurality of different types of sensors 104.

In accordance with an embodiment, the haptic feedback controller 220 may be configured to update the first touch-discernible output layout to the second touch-discernible output layout based on the change of the first proximity range to the second proximity range. The second touch-discernible output layout may correspond to a second reproduction of the 3D real-world area based on the change of the first proximity range to the second proximity range. The second touch-discernible output layout may be a second 3D layout that comprises a second plurality of different haptic indicators. The second plurality of different haptic indicators may be spatially arranged on the haptic feedback interface 112 in the defined region such that a spatial arrangement of a second plurality of objects in the 3D real-world area within the second proximity range may be discernible by tactioception based on a user touch on the second touch-discernible output layout. The second plurality of different haptic indicators may include one or more haptic indicators of the first set of haptic indicators and/or a second set of haptic indicators to discern movement of the second set of moving objects. The second set of moving objects may include one of more objects from the first set of moving objects and/or new objects detected within the second proximity range.

The second touch-discernible output layout may also include the unique haptic indicator that corresponds to a current position of the user 110 of the assistive device 102 on the second touch-discernible output layout. The unique haptic indicator of the second plurality of different haptic indicators generated on the haptic feedback interface 112 may be indicative of a relative (or updated) position of the user 110 with respect to each of the second plurality of objects present in the 3D real-world area within the second proximity range of the assistive device 102.

In accordance with an embodiment, the haptic feedback controller 220 may be configured to execute a haptic zoom-in operation of a portion of the first touch-discernible output layout to increase a haptic resolution of the first touch-discernible output layout on the haptic feedback interface 112 based on the user input via the haptic feedback interface 112. The first touch-discernible output layout may be updated to the second touch-discernible output layout based on the haptic zoom-in operation. In accordance with an embodiment, the haptic feedback controller 220 may be configured to execute a haptic zoom-out operation of a portion of the first touch-discernible output layout to decrease a haptic resolution of the first touch-discernible output layout on the haptic feedback interface 112 based on the user input via the haptic feedback interface 112. The first touch-discernible output layout may be updated to the second touch-discernible output layout based on the haptic zoom-out operation.

In accordance with an embodiment, the second circuitry 210 may be configured to estimate a spatial scaling factor based on the difference between the first proximity range and the second proximity range. The haptic feedback controller 220 may be configured to control a rate-of-change of movement of one or more of haptic indicators of the first set of haptic indicators or the second set of haptic indicators on the haptic feedback interface 112. The rate-of-change of movement may be controlled based on the update of the first touch-discernible output layout to the second touch-discernible output layout and a difference between the first proximity range and the second proximity range. In accordance with an embodiment, the haptic feedback generator 222 may be configured to continuously or periodically update second touch-discernible output layout to reflect change in positioning of the moving objects.

In accordance with an embodiment, the second circuitry 210 may be configured to determine (or compute) an audio scaling factor based on the difference between the first proximity range and the second proximity range. The haptic feedback controller 220 may be configured to control output of an audio feedback by the one or more audio-output devices 224 of the assistive device 102 for the second touch-discernible output layout. The output may be controlled in accordance with the determined audio scaling factor. The output of the audio feedback may be controlled for a non-visual multi-sense discern of the 3D real-world area by the user 110 within the second proximity range. In some embodiments, the output of the audio feedback may be provided as the user navigates from a first location to a second location within the second proximity range. In some embodiments, the output of the audio feedback may be provided based on a haptic input detected on the haptic feedback interface 112.

In a first example, the selected first touch-discernible modality from the plurality of touch-discernible modalities to generate a plurality of different haptic indicators on the haptic feedback interface 112, may correspond to a differential pressure-based modality. The plurality of different haptic indicators refers to the first plurality of different haptic indicators in the first touch-discernible output layout or the second plurality of different haptic indicators in the second touch-discernible output layout. The plurality of different haptic indicators may be generated as multi-level pressure or different amount of pressure on the haptic feedback interface 112 by the haptic feedback generator 222. For example, a first object of the plurality of objects in the 3D real-world area may be discernible by generating a haptic signal through one or more haptic elements of the plurality of haptic elements 218 as a first amount of pressure. This first amount of pressure may be felt by the user 110 when the user 110 touches a specific portion, for example, a first portion, of the haptic feedback interface 112. Similarly, for each position of different objects of the plurality of objects, a different amount of pressure may be generated on the haptic feedback interface 112. Thus, the user 110 may feel different amount of pressure at different points (or portions) on the haptic feedback interface 112. The different amount of pressure enables the user 110 (by touch on the haptic feedback interface 112) to non-visually discern the relative positioning of the plurality of objects of the 3D real world area. The different amount of pressure in the generated first touch-discernible output layout or the second touch-discernible output layout corresponds to the plurality of different haptic indicators generated as multi-level pressure.

In a second example, the selected first touch-discernible modality from the plurality of touch-discernible modalities to generate a plurality of different haptic indicators on the haptic feedback interface 112, may correspond to a differential temperature-based modality. In accordance with an embodiment, the plurality of different haptic indicators may be generated as different temperatures, for example, different combination of hot and cold temperatures, on the haptic feedback interface 112 by the haptic feedback generator 222. For each position of different objects of the plurality of objects, a different temperature level may be generated on the haptic feedback interface 112 through one or more haptic elements of the plurality of haptic elements 218. The different level of temperature may enable the user 110 (by touch on the generated first touch-discernible output layout or the second touch-discernible output layout on the haptic feedback interface 112 to non-visually discern the relative positioning of the plurality of objects including the user 110 in the 3D real world area within the first proximity range or the second proximity range.

In a third example, the selected first touch-discernible modality from the plurality of touch-discernible modalities to generate a plurality of different haptic indicators on the haptic feedback interface 112, may correspond to a differential electric pulse-based modality. In this case, the plurality of different haptic indicators may be generated as different level of electric-pulses on the haptic feedback interface 112 by the haptic feedback generator 222. For each position of different objects of the plurality of objects, a different level of electric-pulse may be generated on the haptic feedback interface 112 through a haptic element of the plurality of haptic elements 218. The different level of electric-pulses may enable the user 110 (by touch on the generated first touch-discernible output layout or the second touch-discernible output layout on the haptic feedback interface 112) to non-visually discern the relative positioning of the plurality of objects of the 3D real world area. The different amount of electric-pulses in each of the generated first touch-discernible output layout or the second touch-discernible output layout may correspond to the plurality of different haptic indicators generated as different level of electric-pulses. Further, when an object of the plurality of objects moves in the 3D real-world area, an electric-pulse (i.e. a haptic indicator) may also be felt on the haptic feedback interface 122 to be moving as a continuous line from one point of the haptic feedback interface 122 to another point to represent the movement and a direction of movement of the object of the plurality of objects in the 3D real-world area. The generation of electric-pulse (i.e. a touch-discernible cue) along a certain path on the haptic feedback interface 122 may be synchronized to the actual movement of the object in the 3D real-world area. This allows the user 110 to understand the path of movement of the object via the haptic feedback interface 112. In accordance with an embodiment, the synchronization of the generation of electric-pulse (i.e. a touch-discernible cue) along a certain path on the haptic feedback interface 122 may be controlled based on the determined spatial scaling factor.

In a fourth example, the selected first touch-discernible modality from the plurality of touch-discernible modalities to generate a plurality of different haptic indicators on the haptic feedback interface 112, may correspond to a differential raised shape pattern-based modality. In this case, the plurality of different haptic indicators may be generated as a plurality of protrusions of different shapes that are extended from the surface of the haptic feedback interface 112. The plurality of protrusions of different shapes are shown, for example, in FIG. 6B, as the first plurality of different haptic indicators 626a to 626j. Each protrusion may be a raised shape-pattern or a bulge that sticks out from at least one or a group of haptic elements of the plurality of haptic elements 218 of the haptic feedback interface 112. The plurality of protrusions represents the plurality of objects of the 3D real-world area within the first proximity range or the second proximity range. One shape may be assigned to one identified object-type of the plurality of objects of the 3D real-world area within the first proximity range to enable the user 110 to discern the object-type when the user 110 touches a protrusion of a defined shape. For example, an oval shape protrusion may denote a particular object-type, for example, a car. Examples of the oval shape protrusions may be the haptic indicators 626e, 626f, 626g, and 630c, as shown in FIG. 6B. A round protrusion may denote a human being. Examples of the round protrusion may be the haptic indicators 626a, 626b, 626c, 630a, and 630b, as shown in FIG. 6B. A square-shaped protrusion may denote a building, and a pole-like or a spike-like protrusion may denote a pillar or a pole in the 3D real-world area within the first proximity range. Examples of the square-shaped protrusion may be the haptic indicators 626h, 626i, and 630d, as shown and described in FIG. 6B. Thus, when the user 110 touches the oval shape protrusion, the user 110 may readily identify the protrusion to be a car. Thus, similar to the sighted people who use information about the features on the surface of an object, like color, shading, or overall size, and shape, to recognize an object, the people who have lost the sense of sight may also have the capability to identify an object based on a touch on the protrusion of a defined shape, where an association of a particular shape with a particular object-type is learned by brain.

In accordance with an embodiment, the plurality of protrusions generated on the haptic feedback interface 112 enables the user 110 to discern not only the object-type but also a relative positioning of the plurality of objects and movement of one or more of the plurality of objects, from the perspective of the user 110. In accordance with an embodiment, the plurality of protrusions may be of same shapes. In such a case, although it may be relatively difficult to identify an object-type, however, the relative position and movement (if any) of each of the plurality of objects from the position of the user 110 may be easily discernible by touch on the plurality of protrusions. Further, as the user 110 is present in the 3D real-world area, the user 110 may hear actual sound emanated from one or more objects of the plurality of objects. Hence, the user 110 may correlate the plurality of protrusions with the plurality of sounds to discern an object-type, an approximate distance to an object of the plurality of objects, or movement of the first set of moving objects or the second set of moving objects. The haptic feedback generator 222 may be configured to control the extending and the retracting of the plurality of protrusions by use of the plurality of haptic elements 218.

In accordance with an embodiment, the haptic feedback generator 222 may be configured to control grouping of the plurality of haptic elements 218 during extension to represent a particular shape for a protrusion. In accordance with an embodiment, the protrusion may be static or may be deformable. The same protrusion may have different meanings based on the deformation. An example of the deformation of the same protrusion (such as the protrusion 230A to protrusions 230B, 230C, 230D, or 230E) is shown and described, for example, in FIG. 2B. In accordance with an embodiment, the plurality of protrusions may be generated by application of different temperatures on different surface area of the haptic feedback interface 112. In such an embodiment, the haptic feedback interface 112 may include a covering on the haptic feedback interface 112. The covering may be a polymer-based layer sensitive to temperature. The plurality of the haptic elements 218 may be arranged as the array of cylindrical tubes below the covering. In cases where, a localized high temperature is generated through one or a group of the haptic elements of the plurality of haptic elements 218, a bulge may appear on the covering of the haptic feedback interface 112. Similarly, different bulge portions may represent the plurality of protrusions. In cases where, a localized low temperature is generated through one or a group of the haptic elements of the plurality of haptic elements 218, the bulge may disappear or subside on the covering of the haptic feedback interface 112. Similarly, different bulge portions may represent the plurality of protrusions. Notwithstanding, the plurality of protrusions may be generated by various methods, such as by electro-chemical process, electro-mechanical process, without limiting the scope of the disclosure. In accordance with an embodiment, the plurality of different haptic indicators may be generated as different level of electric-pulses or a different amount of pressure, such as pain points (or pricking points) that may represent the positioning or movement of the plurality of objects of the 3D real world area in the generated first touch-discernible output layout or the second touch-discernible output layout.

In case of the assistive device 102 is a wearable device, as shown in FIGS. 3, 4A, 4B, and 5, similar haptic indicators (e.g. different amount of pressure, different level of electric-pulses, different temperatures (such as hold and cold), different shape patterns, static or deformable protrusions, movement of haptic indicators), may be felt based on the contact of the skin of the user 110 with the haptic feedback interface 112 that may be wrapped on a body part, such as waist, or arm, as a wearable band. The movement of a haptic indicator, for example, a particular electric-pulse running from one point to another point of the haptic feedback interface 112, may further indicate a movement of an object of the plurality of objects in the 3D real-world area in the first proximity range or the second proximity range.

In certain scenarios, a user of the assistive device 102 may not be able to use all the five fingers of a hand while touching the haptic feedback interface 112. This may be due to one or more missing fingers, restricted movement as a result of injury in one or more fingers, an ailment, some bone fracture, or pain. In such cases, the haptic feedback controller 220 may be configured to automatically detect such impairments or restricted movement of the five fingers of the hand when the hand is placed on the haptic feedback interface 112. In some embodiments, the sensor data from the image-capture device (that may be worn by the user 110) of the plurality of different types of sensors 104, may be used to detect such impairments or restricted movement of the five fingers. The haptic feedback controller 220 may be configured to generate a touch-discernible haptic output layout on the haptic feedback interface 112 in accordance with the detected impairment. For example, the area on which the entire touch-discernible haptic output layout may be reduced or modified to suit the detected impairment. The automatic detection of the impairments may be done when the assistive device 102 is set in auto-mode using a mode control button (not shown). In some embodiments, the user 110 may switch a manual mode, where the user 110 may provide input via the haptic feedback interface 112 to indicate a specific impairment, and configure the generation of the touch-discernible haptic output layout based on the provided input that indicates a particular impairment. In some embodiments, the functions of the control buttons, the haptic feedback interface 112, and the assistive device 102 may be configurable by the user 110 based on user inputs in a configuration mode. The configuration mode may be switched "ON" using a configure button (not shown) provided in the assistive device 102.

Figure 2B:
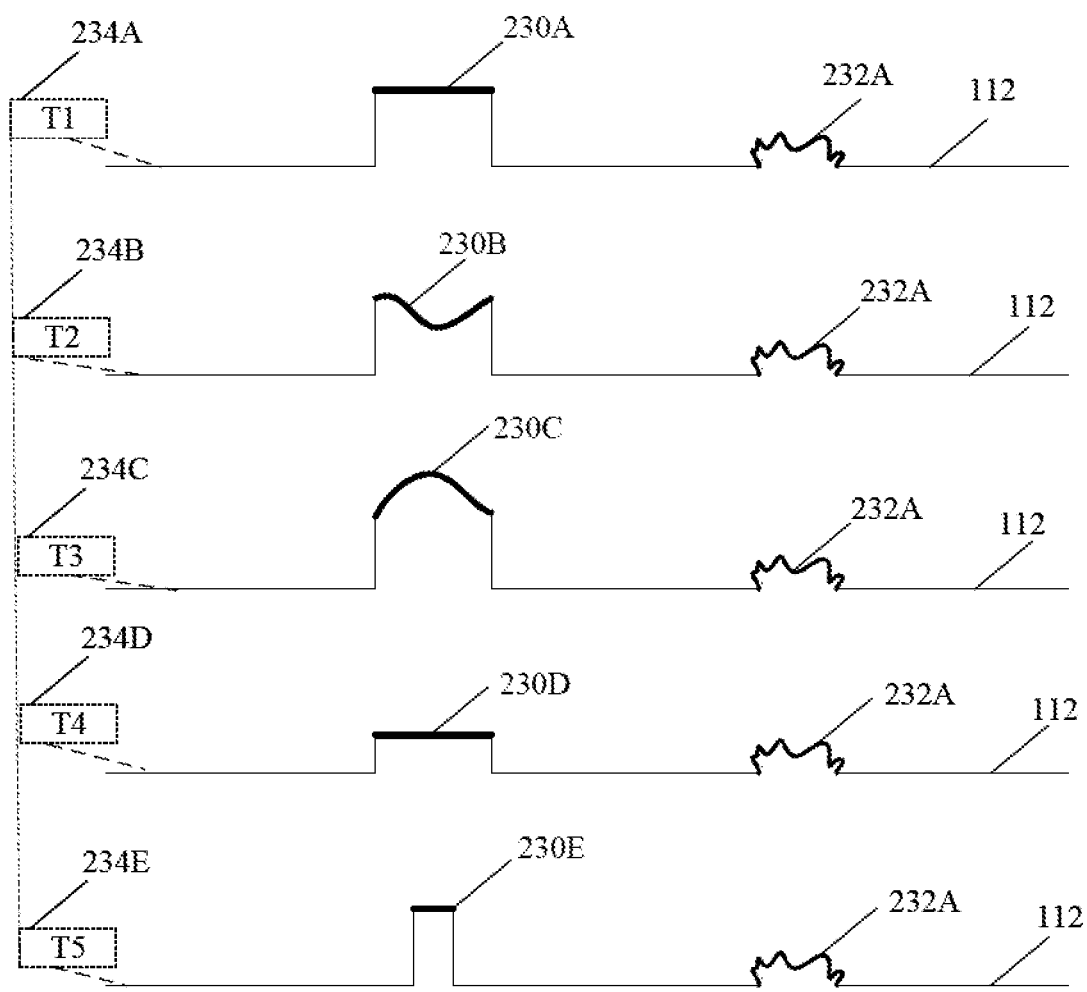
FIG. 2B illustrates exemplary protrusions on a haptic feedback interface of the assistive device of FIG. 2A for providing non-visual assistance to a user, in accordance with an embodiment of the disclosure.

FIG. 2B illustrates exemplary protrusions on a haptic feedback interface of the assistive device of FIG. 2A for providing non-visual assistance to a user, in accordance with an embodiment of the disclosure. With reference to FIG. 2B, there is shown a surface portion of the haptic feedback interface 112 with protrusions 230A to 230E and 232A at different time instants 234A to 234E.

At time instant 234A, the protrusion 230A may be generated on the surface portion of the haptic feedback interface 112 by the haptic feedback generator 222. At time instant 234B, the protrusion 230A (the same protrusion) may deform into a different shape, as shown by the protrusion 230B. At next time instant, such as the time instant 234C, the protrusion 230B may deform further to another shape, such as the protrusion 230C, or return to its original shape, such as the protrusion 230A. The same protrusion, such as the protrusion 230A, may have different meanings based on the deformation (as indicated by protrusions 230B, 230C, 230D, 230E). For example, the user 110 may be present on a river side and use the assistive device 102 to generate a haptic touch-discernible output of the 3D real world area surrounding the user 110. The protrusion 230A may be a haptic indicator generated on the haptic feedback interface 112. The protrusion 230A, for example, may represent water body (such as a river or a pond) ahead of the user 110. The protrusion 230A may be a constantly deforming protrusion (e.g. deformed from protrusion 230A to the protrusions 230B and 230C) at different time instants 234A, 234B, and 234C. Based on a touch on the constantly deforming protrusion (such as the protrusion 230A), the user 110 may discern not only a presence of a water-body, such as the river, based on a touch on the constantly deforming protrusion but also an exact location of the river, and the relative position of the user 110 from the water body in the generated haptic touch-discernible output.

In another example, the deformation of the protrusion 230A may to represent a sudden change in the 3D real-world area. For example, a 3D real-world area surrounding the user 110 may include a sportsman in a playground. The sportsman while playing a game may be standing on the playground or may be walking, and suddenly fell down. In such as a case, the protrusion 230A may be at a first level of elevation from the surface portion of the haptic feedback interface 112. The protrusion 230A may then be deformed to the protrusion 230D to represent a sudden change for the same object (e.g. the sportsman) in the 3D real-world area. The sudden change may be discernible by the user 110 by touching the protrusion 230A and feeling it to deform to some other shape or a second level of elevation, such as the protrusion 230D. The second level of elevation may be different than the first level of elevation. The protrusion 230E, for example, shows a deformation of the protrusion 230A where the size of the protrusion 230A is reduced. Thus, the same protrusion may have different meanings based on the deformation.

In accordance with an embodiment, the plurality of different haptic indicators may be generated as a plurality of protrusions of different shapes that are extended from the surface of the haptic feedback interface 112. The plurality of protrusions of different shapes are shown, for example, in FIG. 6B, as the first plurality of different haptic indicators 626a to 626j. For example, a round shape is indicative of human being, an oval shape may be indicative of vehicles, the square shape is indicative of buildings, the triangle shape is indicative of animal, the raised tapering lines may be indicative of a street. Different shapes generated by the haptic feedback generator 222, may not be limited to the oval, round, square, triangle, and other shapes, for example, any polygonal shapes may be generated based on user-preference. In accordance with an embodiment, the shape of a protrusion may be customized by users of the assistive device 102 in accordance with their needs or preferences. For example, a voice command may be provided by the user 110, for example, "generate a star-shaped pattern to represent a building". At least one of plurality of microphones 214 may capture the voice command. The second circuitry 210 may be configured to interpret the voice command and instruct the haptic feedback controller 220 to generate a star-shaped protrusion based on the interpreted voice command. The haptic feedback controller 220 may be configured to generate the protrusion 232A, which may be in a customized shape, such as the star-shaped pattern. In some embodiments, the customization of shape patterns may be done via the haptic feedback interface 112 using one or more control buttons (not shown).

Figure 3:
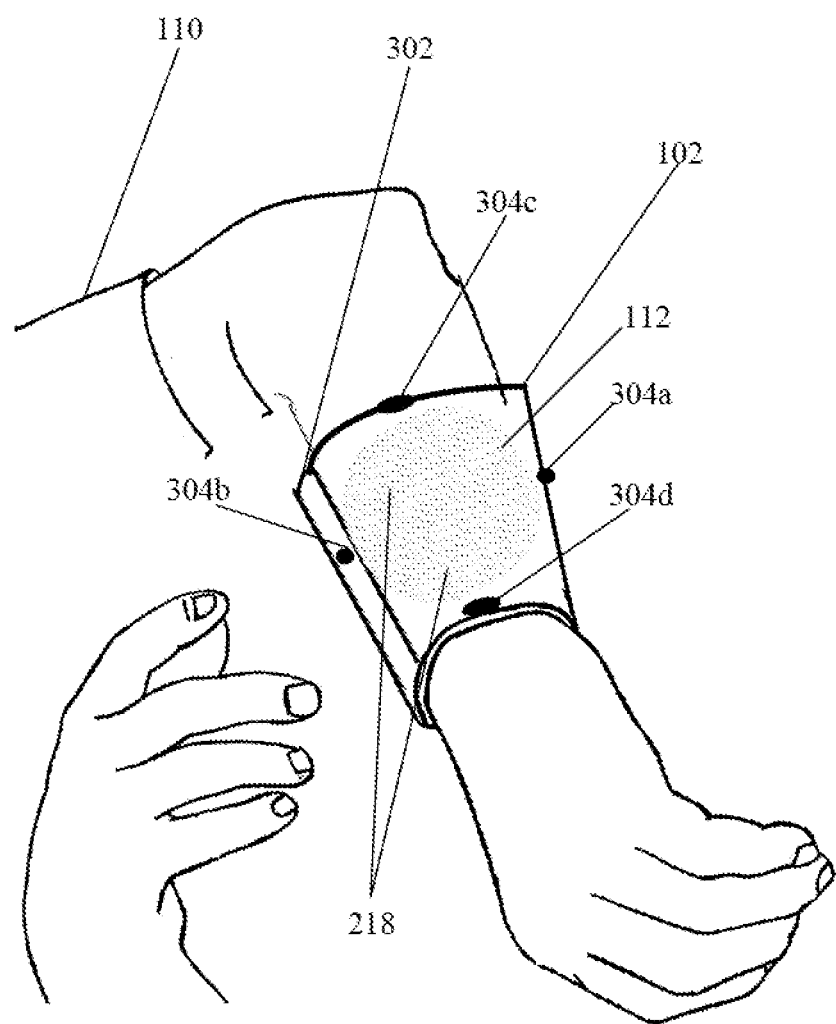
FIG. 3 illustrates a first exemplary implementation of the exemplary assistive device of FIG. 2A as a wearable assistive device for providing non-visual assistance to a user, in accordance with an embodiment of the disclosure.

FIG. 3 illustrates a first exemplary implementation of the exemplary assistive device of FIG. 2A as a wearable assistive device for providing non-visual assistance to a user, in accordance with an embodiment of the disclosure. With reference to FIG. 3, there is shown the assistive device 102 worn by the user 110 as a wearable assistive device, which is described in conjunction with elements from FIGS. 1 and 2. The assistive device 102 includes a wearable pad 302, a plurality of haptic mobility signal generators (HMSG), such as a first HMSG 304a, a second HMSG 304b, a third HMSG 304c, and a fourth HMSG 304d. There is also shown the haptic feedback interface 112 comprising the plurality of haptic elements 218. The wearable pad 302 may correspond to the one or more wearable pads 226.

The plurality of HMSGs refers to customized sensors that are configured to generate haptic signals, such as a vibration, a small localized pain, or a poke, that be sensed by human body. The first HMSG 304a may be configured to generate a first haptic mobility signal to indicate the user 110 to move ahead. The second HMSG 304b may be configured to generate a second haptic mobility signal to indicate the user 110 to stop or perform an about-turn. The third HMSG 304c may be configured to generate a third haptic mobility signal to indicate the user 110 to turn left. Lastly, the fourth HMSG 304d may be configured to generate a fourth haptic mobility signal to indicate the user 110 to turn right. In accordance with an embodiment, the haptic feedback controller 220 may be configured to control output of haptic mobility signals via the plurality of HMSGs to provide navigational assistance, for example, turn left, turn right, stop here, start moving ahead, and the like, in combination with the generated touch-discernible output layouts in both the indoor and the outdoor areas. In some embodiments, one haptic mobility signal may indicate to move one step in that direction. In some embodiments, one haptic mobility signal may indicate to continue moving in a particular direction until a next haptic mobility signal is generated.

Figure 4A:
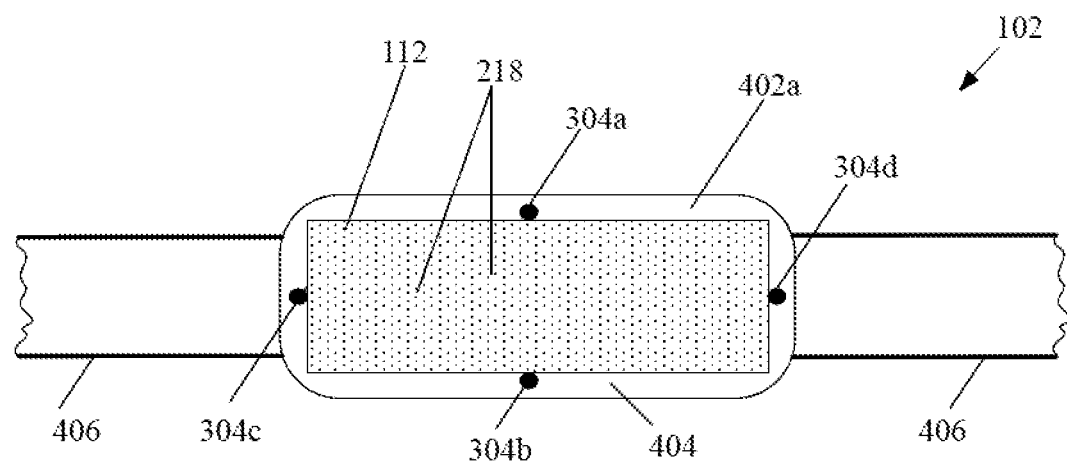
FIGS. 4A and 4B, collectively, illustrates a second exemplary implementation of the exemplary assistive device of FIG. 2A as a wearable assistive device for providing non-visual assistance to a user, in accordance with an embodiment of the disclosure.
Figure 4B:
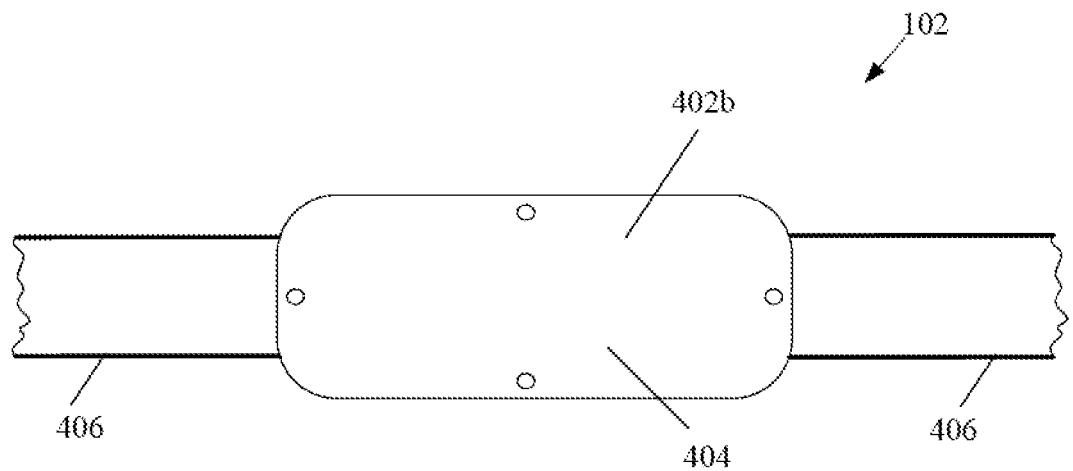

FIGS. 4A and 4B, collectively, illustrates a second exemplary implementation of the exemplary assistive device of FIG. 2A as a wearable assistive device for providing non-visual assistance to a user, in accordance with an embodiment of the disclosure. With reference to FIGS. 4A and 4B, there is shown the assistive device 102 as an exemplary wearable band, which is described in conjunction with elements from FIGS. 1, 2, and 3. With reference to FIG. 4A, there is shown an inner surface 402a of the wearable band that includes the haptic feedback interface 112 that comprises the plurality of haptic elements 218. There is also shown a wearable pad 404, a pad fastener 406, and the plurality of HMSGs 304a to 304d. The wearable pad 404 and the pad fastener 406 may correspond to the one or more wearable pads 226 and the pad fasteners 228. With reference to FIG. 4B, there is shown an outer surface 402b of the wearable band that depicts the wearable pad 404 and the pad fastener 406.

In accordance with the second exemplary implementation, the haptic feedback interface 112 may be a foldable or bendable layer integrated on the wearable pad 404 such that the inner surface 402a is in contact with the skin. The user 110 may be sense the generated first touch-discernible output layout on the haptic feedback interface 112 in hands-free mode. The user 110 may discern movement of one or more moving objects in the surrounding world, such as the first proximity range or the second proximity range, based on the actual movement (or a movement sense created) by the generated first set of haptic indicators in the first touch-discernible output layout. The user 110 may sense the generated second touch-discernible output layout on the haptic feedback interface 112. The output of different haptic mobility signals via the plurality of HMSGs may be controlled to provide navigational assistance in combination with the generated touch-discernible output layouts. For example, referring to FIG. 6B, when the user 110 touches the first touch-discernible output layout 624, the first HMSG 304a may be configured to generate a first haptic mobility signal to indicate the user 110 to move ahead by a step. Another first haptic mobility signal by the first HMSG 304a may inform the user 110 to further move by one step (or a defined number of steps). After certain distance is covered, based on the current position of the user 110, the fourth HMSG 304d may be configured to generate one or more haptic mobility signals to indicate the user 110 to move towards the right of the user 110 for respective steps. The user 110 may feel the changed position of the haptic indicator 626*a* in first touch-discernible output layout 624. The changed position of the haptic indicator 626*a* (which is discernible by touch) may be indicative of the actual movement or distance travelled by the user 110 within the first proximity range 602 (FIG. 6A) in the 3D real-world area with respect to other objects. In one example, if the user 110 touches a specific haptic indicator, for example, the haptic indicator 626*g* in the first touch-discernible output layout 624, the fourth HMSG 304*d* may be configured to generate a short haptic signal to indicate that a car is located towards the right side of the user 110. Similarly, in another example, if the user 110 touches another haptic indicator, for example, the haptic indicator 626*h* in the first touch-discernible output layout 624, the second HMSG 304*b* may be configured to generate a short haptic signal to indicate that the object that corresponds to the haptic indicator 626*h* (such as the building in this case) is located towards the left side of the user 110. This, the output of different haptic mobility signals via the plurality of HMSGs may be controlled to provide navigational assistance in combination with the generated touch-discernible output layouts.

FIG. 5 illustrates a third exemplary implementation of the exemplary assistive device of FIG. 2A as a combination of a plurality of wearable and non-wearable assistive devices for providing non-visual assistance to a user, in accordance with an embodiment of the disclosure. FIG. 5 is described in conjunction with elements from FIGS. 1, 2, 3, 4A, and 4B. With reference to FIG. 5, there is shown a plurality of wearable and non-wearable assistive devices that may be communicatively coupled to each other, via a personal wireless network, such as the first communication network 108A. The plurality of wearable and non-wearable assistive devices comprises a portable assistive device (such as the assistive device 102) and a plurality of wearable bands 502*a*, 502*b*, 502*c*, 502*d*, and 502*e*.

In accordance with the third exemplary implementation, the portable assistive device (e.g. the assistive device 102) may further include a detachable learner unit 504, a proximity range setter 506, a plurality of microphones 508*a* to 508*d*, the biometric sensor 216A, the first audio-output device 224A, the second audio-output device 224B, and the haptic feedback interface 112. There is also shown the plurality of haptic elements 218 of the haptic feedback interface 112. In accordance with an embodiment, the assistive device 102 may include a plurality of other hardware control buttons (not shown), such as a power button to ON/OFF the assistive device 102, a reset button to reset the generated touch-discernible output layouts 624 and 628 (FIG. 6B) on the haptic feedback interface 112, one or more volume control buttons/wheels to control audio output from the first audio-output device 224A and the second audio-output device 224B, a mute button to disable audio output.

The plurality of wearable bands 502*a*, 502*b*, 502*c*, 502*d*, and 502*e* may correspond to the wearable assistive device, such as the assistive device 102, as shown and described of FIGS. 4A and 4B. In some embodiments, when the plurality of wearable bands 502*a*, 502*b*, 502*c*, 502*d*, and 502*e*, are communicatively coupled to the main device, such as the portable electronic device, the plurality of wearable bands 502*a*, 502*b*, 502*c*, 502*d*, and 502*e* may or may not include the haptic feedback interface 112. In such a case, the plurality of wearable bands 502*a*, 502*b*, 502*c*, 502*d*, and 502*e* may include the plurality of HMSGs to generate haptic mobility signals to provide navigational assistance based on signals received from the main device, such as the assistive device 102.

The detachable learner unit 504 may be a learning assistant for the user 110 that may assist the user 110 to learn not only the operation of the assistive device 102 but also help understand meaning of each haptic indicator of the plurality of different haptic indicators generated in the touch-discernible haptic output layouts. For example, the user 110 may provide a haptic input on a haptic indicator generated on the haptic feedback interface 112 in the first touch-discernible haptic output layout. The user 110 may press a protrusion (or a bulge) generated on the haptic feedback interface 112 as the haptic indicator. Based on the amount of pressure exerted by the user 110 while touching the protrusion on the haptic feedback interface 112, the press may be considered a haptic input by the haptic feedback controller 220. In cases where the amount of pressure exerted by the user 110 on a particular point or a protrusion on the haptic feedback interface 112 is greater than a threshold pressure value, the press of the protrusion (or a bulge) may be considered a haptic input for that particular object of the 3D real-world area that is indicated by the pressed protrusion. A corresponding action related to the pressed protrusion may be executed by the haptic feedback controller 220 in association with the second circuitry 210. For example, an oval shape protrusion, which denotes a particular object-type, for example, a car, may be pressed via the haptic feedback interface 112. In accordance with an embodiment, a haptic Braille feedback may be generated on the detachable learner unit 504 based on the received input on the haptic indicator to provide additional information about the haptic indicator. For example, "car" word may appear in Braille. Thus, when the user 110 pushes each haptic indicator to be considered a haptic input, a corresponding haptic Braille feedback may be generated on the detachable learner unit 504 to enable learning about the object-type, distance from the user 110, the shape associated with the haptic indicators, and other meanings in the learning period. Thus, the detachable learner unit 504 acts as the learning assistant or a self-help haptic guide.

In some embodiments, instead of the haptic Braille feedback, a corresponding audio feedback may be generated for the detected haptic input. For example, "this is a car, 15 steps on your right". Such haptic Braille feedback or the voice-based feedback provided in combination to the generated touch-discernible feedback provide a synergistic and enhanced non-visual navigation assistance to the user 110 in real time or near-real time as the user 110 moves in the 3D real-world area. In some embodiments, instead of the haptic Braille feedback or the audio feedback, an actual action in the 3D real-world may be executed. For example, if the pushed haptic indicator corresponds to an electronic device, such as a fan, a light, and the like, the corresponding action may be to automatically switch "OFF" or switch "ON" based on the current state in the 3D real-world. A control signal may be sent by the assistive device 102 in the IoT network, such as the first communication network 108A or the second communication network 108B, to control delivery of corresponding control signal to the target device for a suitable action.

In conventional devices, the input section to receive a haptic input is different from the output section (in a conventional haptic user interface) where the Braille output or other tactile forms of output are generated. Typically, the input section to receive haptic input is a 6-keys or 8-keys Braille input. A separate section to receive input and provide output, may be considered a rudimentary form of HMI, where a generated haptic output may not be capable of receive a further feedback on a particular touch-discernible haptic indicator. In contrast, the same tactile surface area of haptic feedback interface 112 of the assistive device 102 acts both as the haptic input receiver and haptic output generator, where the user 110 may press a protrusion (or a bulge) generated on the haptic feedback interface 112 to provide the haptic input related to a specific object in the vicinity of the assistive device 102. Based on the amount of pressure exerted by the user 110 while touching the protrusion on the haptic feedback interface 112, the press may be considered a haptic input by the haptic feedback controller 220.

The proximity range setter 506 may refer to a hardware proximity setting wheel that may be used to set or change the proximity range to generate the touch-discernible haptic output layouts. For example, the first proximity range may be changed to the second proximity range using the proximity range setter 506.

The plurality of microphones 508a to 508d may correspond to the plurality of microphones 214 (FIG. 2A). Based on a difference in the time of receipt of a sound emanated from an object of a plurality of objects in the 3D real-world area, at each of microphone of the plurality of microphones 508a to 508d, a direction of the object may be determined. For example, the plurality of microphones 508a to 508d four microphones may be placed at four sides (left, right, top, and bottom) of the assistive device 102. In cases, a sound signal from an object, such as a human or vehicle horn, may be first received at the microphone 508a, and then at other microphones 508b, 508c, and 508d. This may indicate that the object may be located at 180-degree in the direction of the placement of the microphone 508a (e.g. front direction) with respect to the current orientation of the assistive device 102. This information, such as the determined direction of the object, may then be utilized during generation of the touch-discernible output layouts or the audio feedback to discern the positioning of the plurality of objects in the 3D real-world area.

The user 110 may sense the generated first touch-discernible output layout or the second touch-discernible output layout on the haptic feedback interface 112. The output of different haptic mobility signals via the plurality of HMSGs may be controlled to provide navigational assistance in combination with the generated touch-discernible output layouts.

Figure 6A:
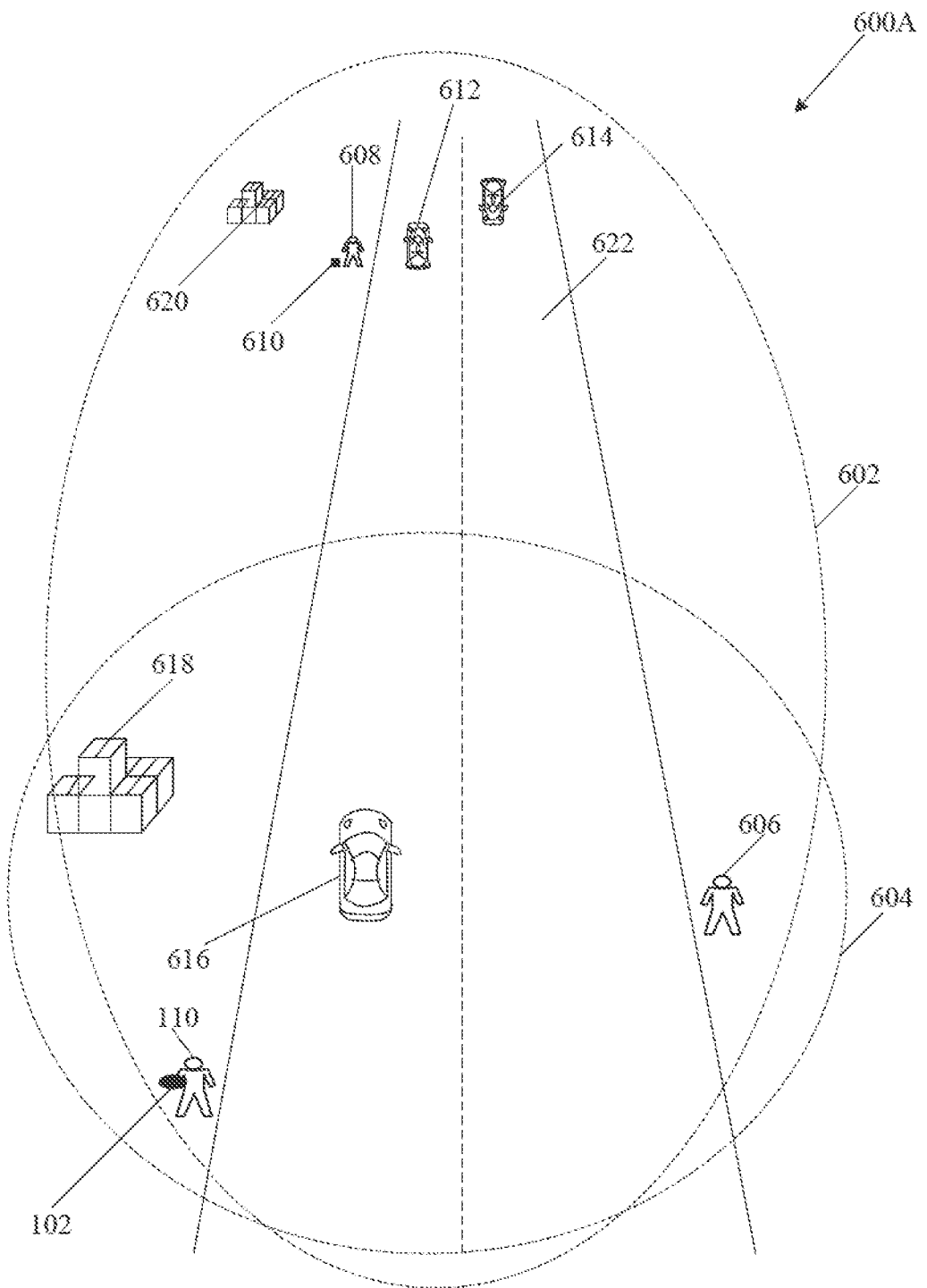
FIGS. 6A and 6B, collectively, illustrate exemplary scenario diagrams for implementation of the assistive device and method for providing non-visual assistance to a user, in accordance with an embodiment of the disclosure.
Figure 6B:
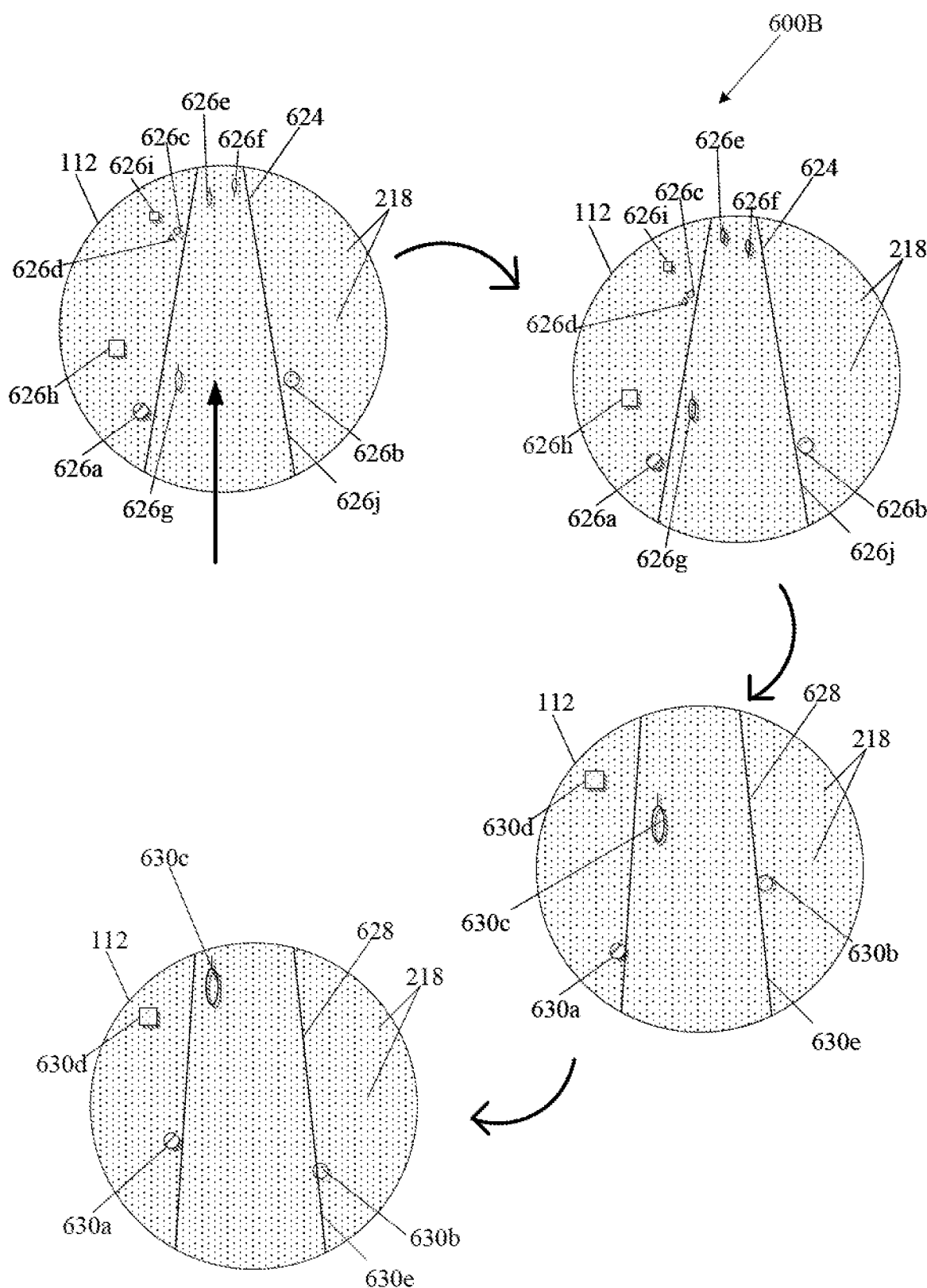

FIGS. 6A and 6B illustrate exemplary scenario diagrams for implementation of the assistive device and method for providing non-visual assistance to a user, in accordance with an embodiment of the disclosure. With reference to FIG. 6A, there is a shown a first exemplary scenario 600A, which is described in conjunction with elements from FIGS. 1, 2, 3, 4A, 4B, and 5. The first exemplary scenario 600A shows the user 110 with a wearable assistive device, such as the assistive device 102, present in a 3D real-world area. There is also shown a first proximity range 602 and a second proximity range 604 of the assistive device 102.

In accordance to the first exemplary scenario 600A, the user 110 may be a person with loss of sight or impaired sight. The 3D-real world area surrounding the user 110 within the first proximity range 602 includes a first plurality of objects. The first plurality of objects may include both moving objects (e.g. the user 110, other persons 606 and 608, an animal 610 (such as a pet dog), a first car 612, a second car 614, a third car 616), and stationary objects (e.g. a first building 618, a second building 620, and a street 622 with a sidewalk area for pedestrians, as shown. The 3D-real world area surrounding the user 110 within the first proximity range 602 may include many other objects, such as trees, street lights, and the like, which are not shown for the sake of brevity.

In accordance with the first exemplary scenario 600A, the user 110 may be wearing the assistive device 102 (for example, as shown in FIG. 3). The user 110 may press a power "ON" button or a start button to initiate receipt of sensor data from the plurality of different types of sensors 104. For example, an image-capture device may be worn as a headset or placed at a suitable position on the body of the user 110 to capture a 360 view of the 3D real-world area that surrounds the user 110 within a first proximity range, for example, "X" meters, where "X" refers to a distance in natural numbers. In this case, the first proximity range may be 100 meters. The proximity range setter 506 may be provided in the assistive device 102, which may be used to set the desired first proximity range by the user 110. In some embodiments, the first proximity range may be a user-specified default range. In some embodiments, the first proximity range may correspond to an equal "X" meters range from the center that corresponds to the position of the user 110. In some embodiments, the first proximity range may correspond to an unequal "X" meters range from the position of the user 110, for example, more area may be covered in front, left, or right of the user 110 based on a direction of movement of the user 110 as compared to the rear area of the user 110.

In accordance with an embodiment, the first circuitry 208 may be configured to receive sensor data of the 3D real-world area within the first proximity range 602 of the assistive device 102. The sensor data may include the captured 360 view of the 3D real-world area that surrounds the user 110 within the first proximity range 602 and RF sensor data that provide an estimation of distances and motion of each the first plurality of objects from the position of the user 110. The sensor data may also include sensed data from the IR sensor of the plurality of different types of sensors 104. The sensed data from the IR sensor may be used to distinguish between living and non-living objects. The sensor data of the 3D real-world area within the first proximity range 602 may be received from the plurality of different types of sensors 104. The plurality of different types of sensors 104 may include wearable sensors that may be worn by the user 110, sensors that may be integrated with the assistive device 102, such as sensors of the sensor cluster unit 216, or sensors provided in other personal devices of the user 110. The sensor data of the 3D real-world area received in real time or near-real time may be used to collect information of the 3D real-world area within the first proximity range 602 of the user 110. The second circuitry 210 may be configured to generate the modified 3D digital model of the 3D real-world area, based on the received sensor data that is transformed in the common format.

With reference to FIG. 6B, there is shown a second exemplary scenario 600B that depicts a first touch-discernible output layout 624 on the haptic feedback interface 112. The first touch-discernible output layout 624 includes a first plurality of different haptic indicators 626a to 626j. The represents the first plurality of objects in the 3D real-world area within the first proximity range 602 of the assistive device 102. The second exemplary scenario 600B also shows a second touch-discernible output layout 628 on the haptic feedback interface 112. The second touch-discernible output layout 628 includes a second plurality of different haptic indicators 630a to 630e.

In accordance with an embodiment, the haptic feedback controller 220 may be configured to generate the first touch-discernible output layout 624 on the haptic feedback interface 112 using the plurality of haptic elements 218 and the haptic feedback generator 222. The first touch-discernible output layout 624 may be generated using the selected first touch-discernible modality, for example, raised shape-pattern based modality, from the plurality of touch-discernible modalities. The first touch-discernible output layout may correspond to a first reproduction of the 3D real-world area within the first proximity range 602 of the assistive device 102. The first touch-discernible output layout 624 may include a first set of haptic indicators, such as the haptic indicators 626a to 626g, to discern movement of the first set of moving objects, such as the user 110, the other persons 606 and 608, the animal 610, the first car 612, the second car 614, and the third car 616 within the first proximity range 602. Similar to the sighted people (i.e. people who have not lost sense of sight) who use information about the features on the surface of an object, like color, shading, or overall size, and shape, to recognize an object, the people who have lost the sense of sight may also identify an object-type and object position based on a touch on the protrusion of a defined shape n the generated first touch-discernible output layout 624, where an association of a particular shape with a particular object-type is learned by the brain. For example, in this case a round shape is indicative of human being, an oval shape may be indicative of vehicles, the square shape is indicative of buildings, the triangle shape is indicative of animal, the raised tapering lines may be indicative of a street. Notwithstanding, different shapes generated by the haptic feedback generator 222, may not be limited to the oval, round, square, or triangle, and that other shapes, for example, any polygonal shapes (e.g. the protrusion 232A (FIG. 2B)) may be generated. In accordance with an embodiment, the shape of a protrusion may be customized by users of the assistive device 102 in accordance with their needs or preferences, as described for example, in FIG. 2B.

The first touch-discernible output layout 624 may also includes a unique haptic indicator, such as the haptic indicator 626a, which corresponds to a current position of the user 110 of the assistive device 102 in the 3D real-world area. It may be advantageous to include the unique haptic indicator that is representative of the user 110 as it enables the user 110 to non-visually discern the 3D real-world area from the perspective of the user 110 in the first proximity range 602 by a touch on the unique haptic indicator (such as the haptic indicator 626a) followed by touch on other haptic indicators of the first plurality of different haptic indicators 626b to 626j generated on the haptic feedback interface 112.

The movement of the first set of haptic indicators, such as the haptic indicators 626a to 626g, may be updated continually or periodically in the first touch-discernible output layout 624 based on the tracked movement of the first set of moving objects, such as the user 110, the other persons 606 and 608, the animal 610, the first car 612, the second car 614, and the third car 616 within the first proximity range 602. Thereafter, the haptic feedback controller 220 may be configured to receive a user input at the assistive device 102 to change the first proximity range 602 to the second proximity range 604. In some embodiments, the haptic feedback controller 220 may be configured to receive the user input via the haptic feedback interface 112 to initiate at least one of a haptic zoom-in feature (shown by the thick arrow mark). In some embodiments, the haptic feedback controller 220 may be configured to receive the user input by a consecutive two-touch input, by the proximity range setter (e.g. the proximity range setter 506) of the assistive device 102.

In accordance with an embodiment, the second circuitry 210 may be configured to calibrate the one or more of the plurality of different types of sensors 104 to receive sensor data in accordance with the second proximity range 604. The second circuitry 210 may be configured to determine the speed and the direction of travel of each of a second set of moving objects, such as the user 110, the person 606, and the third car 616 of a second plurality of objects (that also includes the first building 618) within the second proximity range 604. The second circuitry 210 may be configured to monitor/track the relative position of each of the second plurality of objects with respect to the position of the user 110 of the assistive device 102. The relative position of each of the second plurality of objects may be monitored based on the sensor data of the second proximity range 604 received in real time or near-real time from the plurality of different types of sensors 104.

In accordance with an embodiment, the haptic feedback controller 220 may be configured to update the first touch-discernible output layout 624 to the second touch-discernible output layout 628 based on the change of the first proximity range 602 to the second proximity range 604. The second touch-discernible output layout 628 may correspond to a second reproduction of the 3D real-world area based on the change of the first proximity range 602 to the second proximity range 604. The second plurality of different haptic indicators 630a to 630e may be spatially arranged on the haptic feedback interface 112 such that a spatial arrangement of a second plurality of objects in the 3D real-world area within the second proximity range 604 may be discernible by tactioception based on a user touch on the second touch-discernible output layout 628. The second plurality of different haptic indicators may include one or more haptic indicators 630a, 630b, and 630c to discern movement of the second set of moving objects (such as the user 110, the person 606, and the third car 616). The second set of moving objects may include one of more objects from the first set of moving objects in the first proximity range 602.

In accordance with an embodiment, the haptic feedback controller 220 may be configured to execute a haptic zoom-in operation of a portion of the first touch-discernible output layout 624 to increase a haptic resolution of the first touch-discernible output layout 624 on the haptic feedback interface 112 based on the user input on the portion (shown by thick arrow mark) via the haptic feedback interface 112. The first touch-discernible output layout 624 may be updated to the second touch-discernible output layout 628 based on the haptic zoom-in operation. The second circuitry 210 may be configured to estimate a spatial scaling factor based on the difference between the first proximity range, for example 100 meters, and the second proximity range, for example, 30 meters. The haptic feedback controller 220 may be configured to control a rate-of-change of movement of one or more of haptic indicators (e.g. the haptic indicators 630a, 630b, and 630c) of the first set of haptic indicators or the second set of haptic indicators on the haptic feedback interface 112. The rate-of-change of movement may be controlled based on the determined spatial scaling factor. The determined spatial scaling factor indicates a change of area between the first proximity range 602 and the second proximity range 604 to transform and reflect the change in haptic domain.

In accordance with an embodiment, the haptic feedback generator 222 may be configured to continuously or periodically update the second touch-discernible output layout 628 to reflect change in positioning of the moving objects within the second proximity range 604. In some embodiments, the haptic feedback interface 112 may comprise a plurality of defined regions, for example, two defined regions. In some embodiments, the modality of generation of the plurality of different haptic indicators for the first touch-discernible output layout 624 may be same as the second touch-discernible output layout 628. In some embodiments, the modality of generation of the plurality of different haptic indicators for the first touch-discernible output layout 624 may be different from the second touch-discernible output layout 628.

Similar to the hand-held device, when the assistive device 102 is worn, the skin of the user 110 (e.g. sensory receptors at skin of the forearms, thigh, waist, leg, feet, and the like) may feel the plurality of different haptic indicators 626a to 626j (or 630a to 630e) to perceive the surrounding world. In FIG. 6B, the plurality of different haptic indicators example, are shown to be generated as a plurality of different protrusions of different shapes. However, the plurality of different haptic indicators may also be generated as different level of electric-pulses, different amount of pressure or pain, different level of temperature, or their combination, on the haptic feedback interface 112 by the haptic feedback generator 222, as described in FIG. 2A.

In accordance with an embodiment, the assistive device 102 may include a view-change button. The view-change button may be used by the user 110 to change the capture of sensor data for a front area of the 3D-real world area instead of all the area within the first proximity range 602. Thereby, the touch-discernible output layout may be generated for the front area of the 3D-real world area (i.e. a front view from the perspective of user 110). Similarly, a second press on the view-change button may result in the generation of the touch-discernible output layout for rear view, for example, to view an area behind the user 110.

Figure 7A:
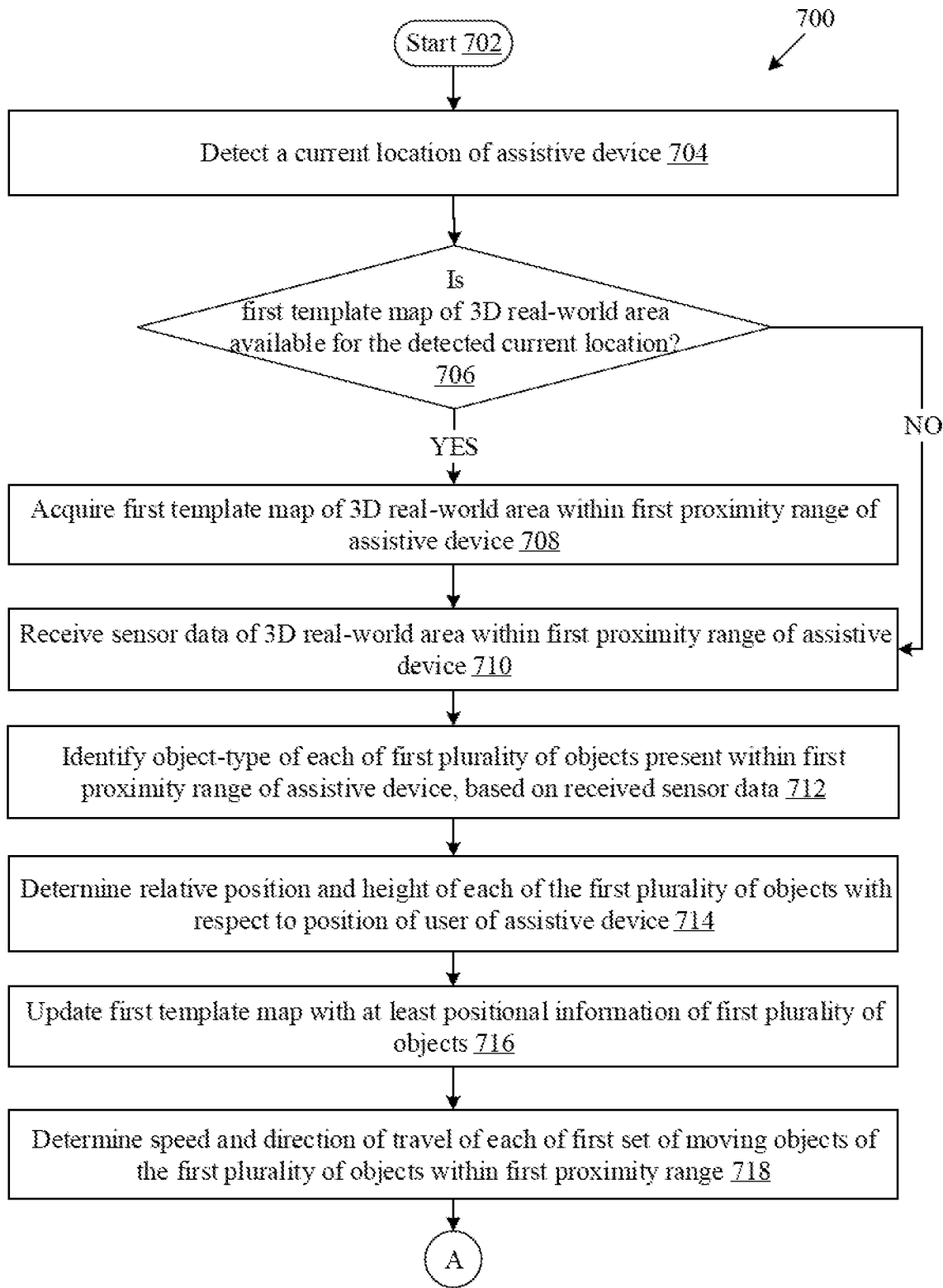
FIGS. 7A, 7B, and 7C, collectively, depict a flow chart that illustrates a method for providing non-visual assistance to a user to perceive the surrounding world, in accordance with an embodiment of the disclosure.
Figure 7B:
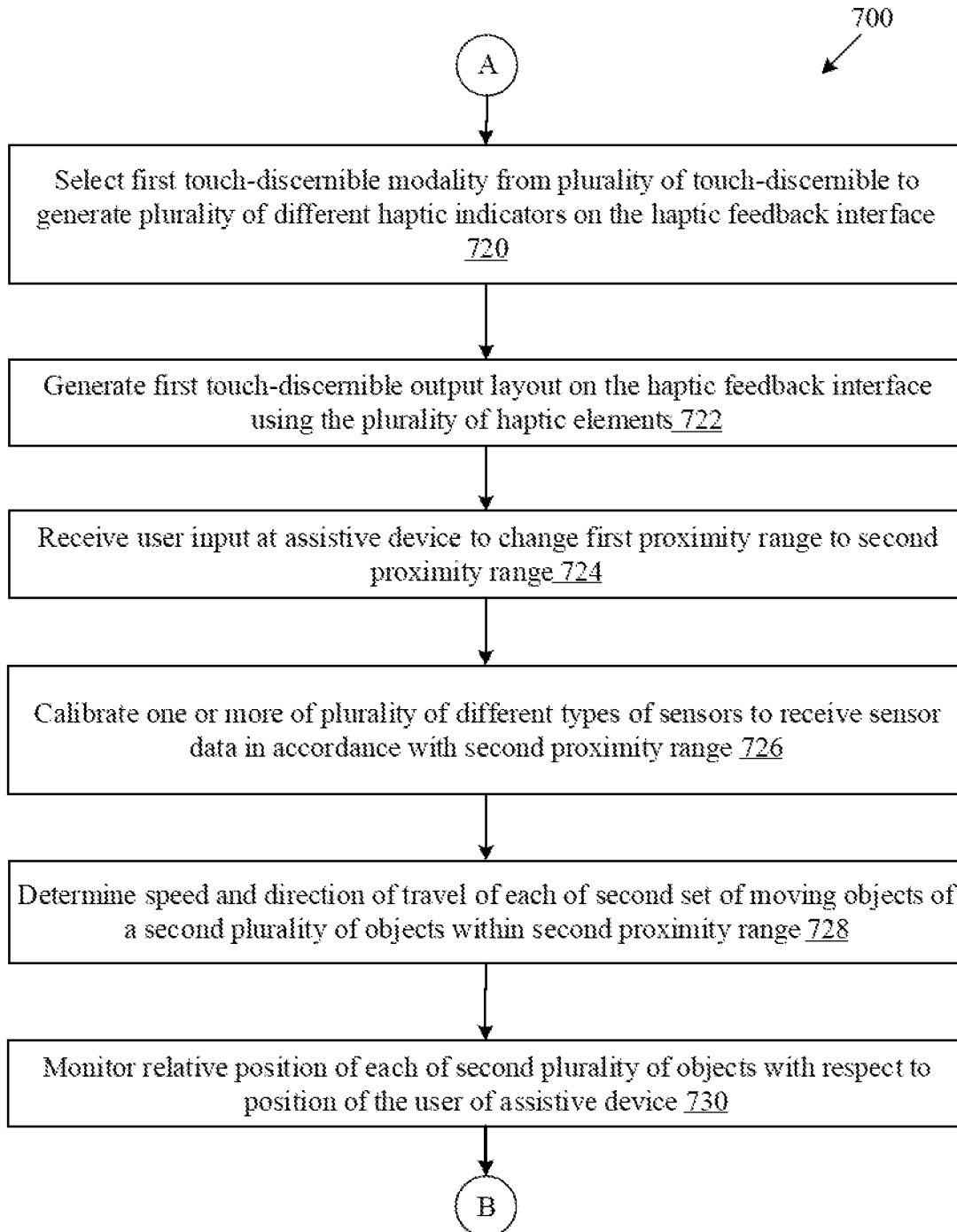
Figure 7C:
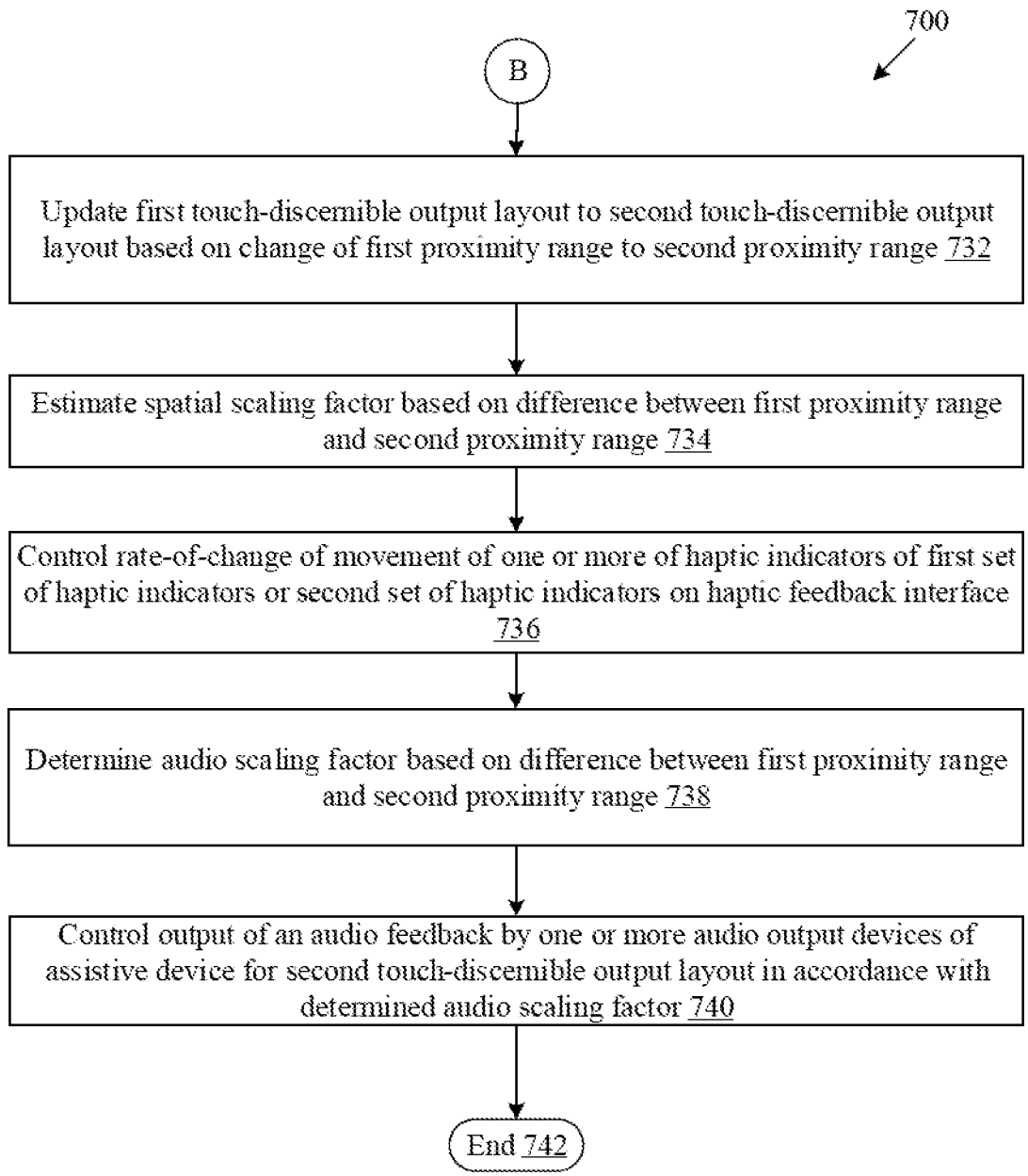

FIGS. 7A and 7B, collectively, depict a flow chart 700 that illustrates a method for providing non-visual assistance to a user to perceive the surrounding world, in accordance with an embodiment of the disclosure. FIGS. 7A and 7B are described in conjunction with elements from the FIGS. 1, 2, 3, 4A, 4B, 5, 6A, and 6B. As shown in FIG. 7A, the method of the flow chart 700 starts at 702 and proceeds to 704.

At 704, a current location of the assistive device 102 may be detected. The second circuitry 210 may be configured to detect the current location of the assistive device 102 using the location sensor. The location sensor may be provided in the sensor cluster unit 216 of the assistive device 102 or may refer to one of the plurality of different types of sensors 104. At 706, it may be checked whether a first template map of a 3D real-world area for the detected current location of the assistive device 102 is available. The availability of the first template map of a 3D real-world area may be checked at the server 106 or the memory 212. In cases where the first template map is available, the control passes to 408, else to 410.

At 708, a first template map of a 3D real-world area within a first proximity range of the assistive device 102 may be acquired. The first circuitry 208 may be configured to acquire the first template map of the 3D real-world area within the first proximity range of the assistive device 102. In some embodiments, the first template map may be acquired from the server 106 based on the current location of the assistive device 102. As the user 110 may be equipped with the assistive device 102, the location of the assistive device 102 may be same as that of the user 110. In some embodiments, the memory 212 may store 2D/3D maps of geographical regions of the earth surface, such as street views for outdoor locations. In such embodiments, the first template map may be retrieved from the memory 212.

At 710, sensor data of the 3D real-world area within the first proximity range of the assistive device 102 may be received. The first circuitry 208 may be configured to receive sensor data of the 3D real-world area within the first proximity range of the assistive device 102 from the plurality of different types of sensors 104 that are communicatively coupled to the assistive device 102. In some embodiments, the sensor data may also be received from the sensor cluster unit 216. In some embodiments, the first template map of a 3D real-world area may not be acquired, for example, in case of indoor locations or for regions where the first template map may not be available. In such a case, the sensor data of the 3D real-world area received in real time or near-real time may be used to collect information of the 3D real-world area within the first proximity range of the assistive device 102.

At 712, an object-type of each of a first plurality of objects present within the first proximity range of the assistive device 102 may be identified, based on the received sensor data. The second circuitry 210 may be further configured to identify the object-type of each of the first plurality of objects present within the first proximity range of the assistive device 102 based on the received sensor data. Examples of the object-type may include, but are not limited to a human being, an animal, a vehicle-type (such as a car, a truck, a bicycle, a two-wheeler, a four-wheeler, and the like), a living object, a non-living object, a moving object, a stationary object, a street, an obstacle, a hazard, a door, stairs, and other physical objects found in indoor or outdoor area of the 3D real-world area.

At 714, a relative position of each of the first plurality of objects with respect to the position of the user 110 of the assistive device 102 may be determined. The second circuitry 210 may be configured to determine the relative position of each of the first plurality of objects with respect to the position of the user 110 of the assistive device 102. The relative position of each of the first plurality of objects may be determined based on the sensor data received in real time or near-real time from the plurality of different types of sensors 104.

At 716, the first template map may be updated with at least positional information of the first plurality of objects, based on the received sensor data of the 3D real-world area within the first proximity range of the assistive device 102. The second circuitry 210 may be configured to update the first template map in real time or near-real time based on the sensor data of the 3D real-world area.

At 718, a speed and a direction of travel of each of a first set of moving objects of the first plurality of different objects within the first proximity range may be determined. The second circuitry 210 may be configured to determine the speed and the direction of travel of each of the first set of moving objects of the first plurality of objects within the first proximity range.

At 720, a first touch-discernible modality from a plurality of touch-discernible modalities may be selected to generate a plurality of different haptic indicators on the haptic feedback interface 112. The selection of the first touch-discernible modality may be based on learned user interaction information and a current weather condition in the 3D real-world area. The learned user interaction information may be determined based on a historical analysis of usage pattern data of the haptic feedback interface 112 by the learning engine provided in the memory 212. The plurality of touch-discernible modalities includes a differential pressure-based modality, a differential temperature-based modality, a differential electric pulse-based modality, a differential raised shape pattern-based modality. In some embodiments, a combination of different touch-discernible modalities may be selected based on the learned user interaction information, the current weather condition in the 3D real-world area, and a specified user-setting.

At 722, a first touch-discernible output layout may be generated on the haptic feedback interface 112 using the plurality of haptic elements 218. The haptic feedback controller 220 may be configured to generate the first touch-discernible output layout on the haptic feedback interface 112 using the plurality of haptic elements 218 and the haptic feedback generator 222. The first touch-discernible output layout may be generated using the selected first touch-discernible modality from the plurality of touch-discernible modalities. The first touch-discernible output layout may correspond to a first reproduction of the 3D real-world area within the first proximity range of the assistive device 102. The first touch-discernible output layout may include at least a first set of haptic indicators to discern movement of the first set of moving objects within the first proximity range. The first touch-discernible output layout may be a first 3D layout that comprises a first plurality of different haptic indicators. The first plurality of different haptic indicators may be spatially arranged on the haptic feedback interface 112 in a defined region such that a spatial arrangement of the first plurality of objects in the 3D real-world area within the first proximity range of the assistive device 102 is discernible by tactioception based on a user touch on the first touch-discernible output layout. The first touch-discernible output layout may also include a unique haptic indicator that corresponds to a position of the user 110 of the assistive device 102. The unique haptic indicator may be one of the first plurality of different haptic indicators generated on the haptic feedback interface 112. The unique haptic indicator may be indicative of a relative position of the user 110 with respect to each of the first plurality of objects present in the 3D real-world area within the first proximity range of the assistive device 102.

At 724, a user input may be received at the assistive device 102 to change the first proximity range to a second proximity range. The haptic feedback controller 220 may be configured to receive the user input to change the first proximity range to the second proximity range. In some embodiments, the haptic feedback controller 220 may be configured to receive the user input via the haptic feedback interface 112 to initiate at least one of a haptic zoom-in feature or a haptic zoom-out feature. In some embodiments, the haptic feedback controller 220 may be configured to receive the user input by the proximity range setter 506 of the assistive device 102. In accordance with an embodiment, the first proximity range may be greater than the second proximity range. In accordance with an embodiment, the first proximity range may be smaller than the second proximity range.

At 726, one or more of the plurality of different types of sensors 104 may be calibrated to receive sensor data in accordance with the second proximity range. The second circuitry 210 may be configured to calibrate the one or more of the plurality of different types of sensors 104 to receive sensor data in accordance with the second proximity range.

At 728, a speed and a direction of travel of each of a second set of moving objects of a second plurality of objects within the second proximity range may be determined. The second circuitry 210 may be configured to determine the speed and the direction of travel of each of the second set of moving objects of the second plurality of objects within the second proximity range.

At 730, a relative position of each of the second plurality of objects with respect to the position of the user 110 of the assistive device 102 may be monitored. The second circuitry 210 may be configured to monitor (or track) the relative position of each of the second plurality of objects with respect to the position of the user 110 of the assistive device 102. The relative position of each of the second plurality of objects may be monitored based on the sensor data of the second proximity range received in real time or near-real time from the plurality of different types of sensors 104.

At 732, the first touch-discernible output layout may be updated to a second touch-discernible output layout based on the change of the first proximity range to the second proximity range. The haptic feedback controller 220 may be configured to update the first touch-discernible output layout to the second touch-discernible output layout. The second touch-discernible output layout may correspond to a second reproduction of the 3D real-world area based on the change of the first proximity range to the second proximity range. In accordance with an embodiment, the second touch-discernible output layout may be a second 3D layout that comprises a second plurality of different haptic indicators. The second plurality of different haptic indicators may be spatially arranged on the haptic feedback interface 112 in the defined region such that a spatial arrangement of a second plurality of objects in the 3D real-world area within the second proximity range may be discernible by tactioception based on a user touch on the second touch-discernible output layout. The second plurality of different haptic indicators may include one or more haptic indicators of the first set of haptic indicators and/or a second set of haptic indicators to discern movement of the second set of moving objects. The second set of moving objects may include one of more objects from the first set of moving objects and/or new objects detected within the second proximity range. The second touch-discernible output layout may also include the unique haptic indicator that corresponds to a current position of the user 110 of the assistive device 102 on the second touch-discernible output layout. The unique haptic indicator of the second plurality of different haptic indicators generated on the haptic feedback interface 112 may be indicative of a relative (or updated) position of the user 110 with respect to each of the second plurality of objects present in the 3D real-world area within the second proximity range of the assistive device 102.

In accordance with an embodiment, the haptic feedback controller 220 may be configured to execute a haptic zoom-in operation of a portion of the first touch-discernible output layout to increase a haptic resolution of the first touch-discernible output layout on the haptic feedback interface 112 based on the user input via the haptic feedback interface 112. The first touch-discernible output layout may be updated to the second touch-discernible output layout based on the haptic zoom-in operation. In accordance with an embodiment, the haptic feedback controller 220 may be configured to execute a haptic zoom-out operation of a portion of the first touch-discernible output layout to decrease a haptic resolution of the first touch-discernible output layout on the haptic feedback interface 112 based on the user input via the haptic feedback interface 112. The first touch-discernible output layout may be updated to the second touch-discernible output layout based on the haptic zoom-out operation.

At 734, a spatial scaling factor may be estimated based on the difference between the first proximity range and the second proximity range. The second circuitry 210 may be configured to estimate the scaling factor based on the difference between the first proximity range and the second proximity range.

At 736, a rate-of-change of movement of one or more of haptic indicators of the first set of haptic indicators or the second set of haptic indicators may be controlled on the haptic feedback interface 112. The rate-of-change of movement may be controlled based on the update of the first touch-discernible output layout to the second touch-discernible output layout and a difference between the first proximity range and the second proximity range. For example, in cases where a sighted user looks very far (e.g. beyond "X" meters) in the 3D real-world area, the changes, such as movement of objects, may appear slow as compared to when the sighted user looks nearby (i.e. up to "Y" meters). In cases where the sighted user looks nearby (e.g. Y=30 meters), the changes, such as movement of objects, appears to be very fast. Thus, in haptic domain, the one or more of haptic indicators of the first set of haptic indicators or the second set of haptic indicators that indicate moving objects requires to be controlled in accordance with the difference between the first proximity range and the second proximity range (i.e. X-Y) for a realistic discerning of the 3D real-world area in accordance with the change in the proximity range, for example from far-to-near or from near-to-far.

At 738, an audio scaling factor may be determined based on the difference between the first proximity range and the second proximity range. The second circuitry 210 may be configured to determine (or compute) the audio scaling factor based on the difference between the first proximity range and the second proximity range.

At 740, output of an audio feedback by the one or more audio-output devices 224 of the assistive device 102 for the second touch-discernible output layout may be controlled in accordance with the determined audio scaling factor. The output of the audio feedback may be controlled for a non-visual multi-sense discern of the 3D real-world area by the user 110 within the second proximity range. In accordance with an embodiment, the output of the audio feedback may be provided as the user navigates from a first location to a second location within the second proximity range. In accordance with an embodiment, the output of the audio feedback may be provided based on a haptic input detected on the haptic feedback interface 112. Control passes to end 742.

In accordance with an exemplary aspect of the disclosure, a system for providing non-visual assistance to a user (e.g. the user 110) to perceive the surrounding world is disclosed. The system may include the assistive device 102 (FIGS. 1, 2, 3, 4A, 4B, and 5), which may comprise the haptic feedback interface 112 (FIG. 1) comprising the plurality of haptic elements 218 (FIG. 2A). The assistive device 102 may further comprise the haptic feedback controller 220 configured to generate a first touch-discernible output layout on the haptic feedback interface 112 using the plurality of haptic elements 218. The first touch-discernible output layout may correspond to a first reproduction of a 3D real-world area within a first proximity range of the assistive device 102. The first touch-discernible output layout includes at least a first set of haptic indicators to discern movement of a first set of moving objects within the first proximity range. The haptic feedback controller 220 may be further configured to update the first touch-discernible output layout to a second touch-discernible output layout based on a change of the first proximity range to a second proximity range. The haptic feedback controller 220 may be configured to control a rate-of-change of movement of one or more of haptic indicators of the first set of haptic indicators or a second set of haptic indicators within the second proximity range on the haptic feedback interface 112, based on the update and a difference between the first proximity range and the second discern proximity range.

The present disclosure may be realized in hardware, or a combination of hardware and software. The present disclosure may be realized in a centralized fashion, in at least one computer system, or in a distributed fashion, where different elements may be spread across several interconnected computer systems or the special-purpose device. A computer system or other special-purpose apparatus adapted to carry out the methods described herein may be suited. The present disclosure may be realized in hardware that comprises a portion of an integrated circuit that also performs other functions.

The present disclosure may also be embedded in a computer program product, which comprises all the features that enable the implementation of the methods described herein, and which, when loaded in a special-purpose machine or computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. An assistive device, comprising:
    a haptic feedback interface that comprises a plurality of haptic elements; and
    a haptic feedback controller configured to:
        transform sensor data of a three-dimensional (3D) real-world area within a first proximity range of the assistive device into a defined format, wherein the sensor data is associated with a plurality of different types of sensors;
        generate a first touch-discernible output layout on the haptic feedback interface by the plurality of haptic elements,
        wherein the first touch-discernible output layout corresponds to a first reproduction of the 3D real-world area within the first proximity range of the assistive device,
        wherein the first touch-discernible output layout includes at least a first set of haptic indicators to discern movement of a first set of moving objects within the first proximity range,
        wherein the first touch-discernible output layout is generated based on the transformation of the sensor data of the 3D real-world area within the first proximity range of the assistive device into the defined format;

update the first touch-discernible output layout to a second touch-discernible output layout based on a change of a plurality of objects of the 3D real-world area within the first proximity range,
 wherein the plurality of objects of the 3D real-world area within the first proximity range are associated the plurality of haptic elements;
 determine a direction and a speed of the plurality of objects in the 3D real-world area within the first proximity range; and
 control, by the haptic feedback controller, a movement of one or more of haptic indicators of the first set of haptic indicators or a second set of haptic indicators on the haptic feedback interface, based on the determined direction and the speed of the plurality of objects of the 3D real-world area and the first proximity range.

2. The assistive device according to claim 1, wherein the first touch-discernible output layout is a first 3D layout that comprises a first plurality of different haptic indicators that are spatially arranged on the haptic feedback interface in a defined region such that a spatial arrangement of a first plurality of objects in the 3D real-world area within the first proximity range of the assistive device is discernible by tactioception, wherein the spatial arrangement of the first plurality of objects in the 3D real-world area within the first proximity range of the assistive device is discernible based on a user touch on the first touch-discernible output layout.

3. The assistive device according to claim 1, wherein the second touch-discernible output layout is a second 3D layout that comprises a second plurality of different haptic indicators that are spatially arranged on the haptic feedback interface in a defined region such that a spatial arrangement of a second plurality of objects in the 3D real-world area within a second proximity range of the assistive device is discernible by tactioception,
 wherein the second plurality of objects in the 3D real-world area within the second proximity range of the assistive device is discernible based on a user touch on the second touch-discernible output layout.

4. The assistive device according to claim 1, wherein the haptic feedback controller is further configured to generate a plurality of different haptic indicators on the haptic feedback interface by the plurality of haptic elements to discern the plurality of objects of the 3D real-world area within the first proximity range from the assistive device.

5. The assistive device according to claim 4, wherein the plurality of different haptic indicators are generated by a touch-discernible modality that includes at least one of a differential pressure-based modality, a differential temperature-based modality, a differential electric pulse-based modality, or a differential raised shape pattern-based modality.

6. The assistive device according to claim 1, further comprising a first circuitry configured to receive the sensor data of the 3D real-world area within the first proximity range of the assistive device in real time or near-real time from the plurality of different types of sensors that are communicatively coupled to the assistive device.

7. The assistive device according to claim 6, further comprising a second circuitry configured to identify an object-type of each of the plurality of objects within the first proximity range of the assistive device based on the sensor data.

8. The assistive device according to claim 7, wherein the haptic feedback controller is further configured to generate a plurality of different haptic indicators via the haptic feedback interface to discern different identified object-types of the plurality of objects within the first proximity range of the assistive device by tactioception,
 wherein the different identified object-types of the plurality of objects within the first proximity range of the assistive device is discerned based on a user touch on a defined region of the haptic feedback interface.

9. The assistive device according to claim 1, further comprising a second circuitry configured to determine a spatial scaling factor based on a difference between the first proximity range and a second proximity range.

10. The assistive device according to claim 9, wherein the first proximity range is greater than the second proximity range.

11. The assistive device according to claim 9, wherein the first proximity range is smaller than the second proximity range.

12. The assistive device according to claim 1, wherein each of the first set of haptic indicators in the first touch-discernible output layout is generated as a protrusion of a defined shape-pattern from the haptic feedback interface,
 wherein a series of protrusions are generated along a path on the haptic feedback interface to discern movement of an object of the first set of moving objects within the first proximity range by tactioception,
 wherein the movement of the object of the first set of moving objects within the first proximity range is discerned based on a user touch on the first touch-discernible output layout on the haptic feedback interface.

13. The assistive device according to claim 1, further comprising a second circuitry configured to acquire a first template map of the 3D real-world area within the first proximity range of the assistive device from a server based on a current position of the assistive device in the 3D real-world area.

14. The assistive device according to claim 13, wherein the second circuitry is further configured to update the first template map with at least positional information of the first set of moving objects based on the sensor data of the 3D real-world area within the first proximity range of the assistive device,
 wherein the sensor data is received from the plurality of different types of sensors in real time or near-real time.

15. The assistive device according to claim 1, wherein the haptic feedback controller is further configured to output an audio feedback by one or more audio output devices provided in the assistive device in combination with the first touch-discernible output layout or the second touch-discernible output layout for a non-visual multi-sense discern of 3D real-world area within the first proximity range of the assistive device by a user of the assistive device,
 wherein the output of the audio feedback is provided as the user navigates from a first location to a second location within the first proximity range.

16. The assistive device according to claim 1, wherein the haptic feedback controller is further configured to execute a haptic zoom-in operation of a portion of the first touch-discernible output layout to increase a haptic resolution of the first touch-discernible output layout on the haptic feedback interface,
 wherein the haptic zoom-in operation of the portion of the first touch-discernible output layout is executed based on a user input via the haptic feedback interface, and
 wherein the first touch-discernible output layout is updated to the second touch-discernible output layout based on the haptic zoom-in operation.

17. The assistive device according to claim 1, wherein the first touch-discernible output layout includes a unique haptic indicator that corresponds to a position of a user of the assistive device, and wherein the unique haptic indicator of a first plurality of different haptic indicators generated on the haptic feedback interface is indicative of a relative position of the user with respect to each of the plurality of objects in the 3D real-world area within the first proximity range of the assistive device.

18. The assistive device according to claim 1, wherein the second touch-discernible output layout includes a unique haptic indicator that corresponds to a current position of a user of the assistive device on the second touch-discernible output layout, wherein the unique haptic indicator of a second plurality of different haptic indicators generated on the haptic feedback interface is indicative of a relative position of the user with respect to each of the plurality of objects in the 3D real-world area within a second proximity range of the assistive device.

19. An method, comprising:

in an assistive device that comprises a haptic feedback controller and a haptic feedback interface that includes a plurality of haptic elements:

transforming sensor data of a three-dimensional (3D) real-world area within a first proximity range of the assistive device into a defined format, wherein the sensor data is associated with a plurality of different types of sensors;

generating, by the haptic feedback controller, a first touch-discernible output layout on the haptic feedback interface by the plurality of haptic elements, wherein the first touch-discernible output layout corresponds to a first reproduction of the 3D real-world area within the first proximity range of the assistive device, and wherein the first touch-discernible output layout includes at least a first set of haptic indicators to discern movement of a first set of moving objects within the first proximity range, wherein the first touch-discernible output layout is generated based on the transformation of the sensor data of the 3D real-world area within the first proximity range of the assistive device into the defined format;

updating, by the haptic feedback controller, the first touch-discernible output layout to a second touch-discernible output layout based on a change of a plurality of objects of the 3D real-world area within the first proximity range, wherein the plurality of objects of the 3D real-world area within the first proximity range are associated the plurality of haptic elements;

determining a direction and a speed of the plurality of objects in the 3D real-world area within the first proximity range; and controlling, by the haptic feedback controller, a movement of one or more of haptic indicators of the first set of haptic indicators or a second set of haptic indicators on the haptic feedback interface, based on the determined direction and the speed of the plurality of objects of the 3D real-world area and the first proximity range.

20. The method according to claim 19, further comprising receiving, by a first circuitry of the assistive device, the sensor data of the 3D real-world area within the first proximity range of the assistive device in real time or near-real time from the plurality of different types of sensors that are communicatively coupled to the assistive device.

\* \* \* \* \*